(12) United States Patent
Dykema

(10) Patent No.: US 11,514,229 B2
(45) Date of Patent: Nov. 29, 2022

(54) DOCUMENT PROCESSOR PROGRAM HAVING DOCUMENT-TYPE DEPENDENT USER INTERFACE

(71) Applicant: Not Invented Here LLC, Essex Fells, NJ (US)

(72) Inventor: Erik James Dykema, Essex Fells, NJ (US)

(73) Assignee: Not Invented Here LLC, Essex Fells, NJ (US)

( * ) Notice: Subject to any disclaimer, the term of this patent is extended or adjusted under 35 U.S.C. 154(b) by 0 days.

(21) Appl. No.: 17/248,397

(22) Filed: Jan. 22, 2021

(65) Prior Publication Data

US 2021/0141990 A1 May 13, 2021

Related U.S. Application Data

(63) Continuation of application No. 16/578,711, filed on Sep. 23, 2019, now Pat. No. 10,936,787, which is a continuation of application No. 15/686,832, filed on Aug. 25, 2017, now abandoned, which is a continuation of application No. 14/204,935, filed on Mar. 11, 2014, now Pat. No. 9,779,063.

(Continued)

(51) Int. Cl.
*G06F 17/00* (2019.01)
*G06F 40/103* (2020.01)
*G06F 16/583* (2019.01)
*G06F 40/186* (2020.01)

(52) U.S. Cl.
CPC ........ *G06F 40/103* (2020.01); *G06F 16/5854* (2019.01); *G06F 40/186* (2020.01)

(58) Field of Classification Search
CPC .... G06F 40/166; G06F 40/163; G06F 40/103; G06F 16/5854; G06F 40/186
USPC .................................................. 715/243, 255
See application file for complete search history.

(56) References Cited

U.S. PATENT DOCUMENTS

| 6,618,733 | B1 * | 9/2003 | White | G06F 16/288 |
| | | | | 707/739 |
| 7,054,823 | B1 * | 5/2006 | Briegs | G16H 10/20 |
| | | | | 705/2 |

(Continued)

OTHER PUBLICATIONS

HotDocs 10, Installation Guide and Tutorial, Published 2010 (Year: 2010).*

*Primary Examiner* — Stephen S Hong
*Assistant Examiner* — Matthew J Ludwig
(74) *Attorney, Agent, or Firm* — Bochner IP, PLLC; Andrew D. Bochner

(57) ABSTRACT

Systems and methods for document processing are discussed herein. In certain embodiments, novel document processor programs may allow for a knowledge worker to concentrate on the content of a document, rather than its formatting. Such programs may separately store layout and/or typesetting information from content, allowing for their combination after the content is created. Novel data structures and techniques are provided to permit the use of advanced version control, collaboration techniques and team/or workflows. User interfaces are also disclosed which dynamically adapt to a document type and/or a portion of a document being edited. Such features may significantly increase knowledge worker drafting efficiency.

20 Claims, 31 Drawing Sheets

Related U.S. Application Data

(60) Provisional application No. 61/802,031, filed on Mar. 15, 2013.

(56) References Cited

U.S. PATENT DOCUMENTS

| | | | | |
|---|---|---|---|---|
| 7,467,149 | B2* | 12/2008 | Gaurav | G06F 40/221 715/239 |
| 8,700,682 | B2* | 4/2014 | Tedder | G06F 16/958 707/811 |
| 2003/0144969 | A1* | 7/2003 | Coyne | G06Q 10/06 705/400 |
| 2004/0030715 | A1* | 2/2004 | White | G06F 16/288 707/999.102 |
| 2004/0078776 | A1* | 4/2004 | Moon | G06Q 40/08 717/113 |
| 2006/0288270 | A1* | 12/2006 | Gaurav | G06F 40/174 715/210 |
| 2009/0006947 | A1* | 1/2009 | Corning | G06F 40/226 715/255 |
| 2010/0332971 | A1* | 12/2010 | Spradley | G06F 40/143 715/234 |
| 2013/0036348 | A1* | 2/2013 | Hazard | G06F 40/123 715/230 |
| 2013/0185252 | A1* | 7/2013 | Palmucci | G06F 40/197 707/608 |
| 2013/0185622 | A1* | 7/2013 | Odean | G06F 16/835 715/230 |
| 2013/0204664 | A1* | 8/2013 | Romagnolo | G06Q 30/0203 705/7.32 |
| 2014/0075285 | A1* | 3/2014 | Di Blas | G06F 40/117 715/234 |
| 2014/0281850 | A1* | 9/2014 | Prakash | G06F 40/143 715/202 |
| 2015/0161079 | A1* | 6/2015 | Grosfeld | G06F 40/103 715/209 |
| 2015/0163530 | A1* | 6/2015 | Bayer | H04N 21/44222 725/9 |
| 2016/0296798 | A1* | 10/2016 | Balakrishnan | H04L 67/1095 |

\* cited by examiner

Interrogatory Response

1. Has Acme Corp. ever sold widgets that incorporate gadgets? 814

Defendant objects to this request as pertaining to information subject to the attorney client privilege. Defendant objects to this request as seeking material not relevant to the claims or defenses at issue.

2. Has Acme Corp ~~purchase gadgets~~ to

- ☑ Objection - Privilege
- ☑ Objection - Relevance
- ☐ Objection - Vague

833

Req. / Res. / ¶ / M1 / M2 / Req.

Meta Data | Body | MadLibs | Preview

DOCUMENT PROCESSOR PROGRAM HAVING DOCUMENT-TYPE DEPENDENT USER INTERFACE

CROSS-REFERENCE TO RELATED APPLICATIONS

This application is a continuation of U.S. utility patent application Ser. No. 16/578,711 titled "DOCUMENT PROCESSOR PROGRAM HAVING DOCUMENT-TYPE DEPENDENT USER INTERFACE," filed Sep. 23, 2019, which is a continuation of U.S. utility patent application Ser. No. 15/686,832, titled "DOCUMENT PROCESSOR PROGRAM HAVING DOCUMENT-TYPE DEPENDENT USER INTERFACE," filed Aug. 25, 2017, which is a continuation of U.S. utility patent application Ser. No. 14/204,935, titled "DOCUMENT PROCESSOR PROGRAM HAVING DOCUMENT-TYPE DEPENDENT USER INTERFACE," filed Mar. 11, 2014, which claims the benefit of U.S. provisional patent application Ser. No. 61/802,031, titled "Document Processor Program Having Document-Type Dependent User Interface," filed Mar. 15, 2013. Each of the above applications is incorporated by reference herein in its entirety.

BACKGROUND

Currently, many professional services industries, including law firms and the legal services industry, are in the midst of business model changes. An increase in the number of potential workers (e.g., college and/or law school graduates) and providers has created pricing pressure on fees in certain markets. Moreover, the increasing sophistication of consumers and purchasers of professional services (e.g., in house counsel) has lead to ever increasing demands for higher levels of efficiency. Such factors have lead many service providers to change from billing work by the hour to so-called alternative fee arrangements, including but not limited to capped fee arrangements, contingency arrangements, and other billing arrangements. Knowledge workers are under increased pressure to create work product that is complete and correct, in lesser amounts of time.

For many knowledge workers, the drafting of various types of documents and reports is an activity occupying a significant portion of their time. Many tools exist to help knowledge workers draft documents, but the primary tool in actual use is generally a word processor such as the MICROSOFT WORD™ or GOOGLE DOCS™ word processing systems.

Word processors have various common drawbacks including the combination of content and formatting in the drafting interface, which forces the knowledge worker to perform the work of a layout designer or typographer. Further, currently used systems are constrained by primitive version control and the inability to easily combine the contributions of multiple writers. Native client systems such as the MICROSOFT WORD™ word processing program generally lack online multi-user concurrent editing. Online systems such as GOOGLE DOCS™ word processing system permit concurrent editing, but are often unsuitable for use in a professional setting at least because they may not integrate with enterprise document management systems.

Furthermore, known systems are constrained by a common reliance on markup, stream, or simple file-based data formats lacking the flexibility to incorporate advanced functionality such as references, linking to internal and outside content, and variable substitution. Many simple operations such as loops or the substitution of variable text patterns is difficult or impossible to accomplish without scripting, which is not within the skillset of most knowledge workers. Moreover, known systems typically do not allow the document drafter to incorporate material from the context of the situation the document is intended for (e.g. something referenced by the document, an older document, an exhibit, the pleadings of a lawsuit, etc.), or to deliver a drafted document directly to its intended recipient (e.g. PACER, a court's electronic filing system or a USPTO filing system.)

Very simple editors do exist which do not mix formatting and content in the user interface, such as NOTEPAD™ on MICROSOFT WINDOWS™ XP™, or EMACS™. However, these editors cannot produce the professional quality print output required by document drafting professionals. Further, these simple editors typically cannot include other media types into their documents, such as images, tables, or exhibits.

Systems used to store and manage document files include document management systems such as the IMANAGE WORKSITE™ or KNOWLEDGETREE™ document management systems. These systems may attempt to help professionals keep track of differing versions of documents. However, these systems generally lack the flexibility and power of modern revision control systems and may prevent efficient, optimized workflows for collaboration. Use of document management systems in combination with modern version control paradigms and workflows is not currently possible, because document management systems lack the ability to "introspect" documents and discern what changes were made, by who, and when; thus eliminating the potential benefits to be gained by revision control.

In light of the aforementioned and other limitations and failings of known document drafting software tools, there is a clear and unmet demand for more powerful systems and methods for drafting documents. It would be beneficial if such a system could provide, among other features, the separation of typesetting and/or layout of a document from the drafting of content and could enable the dynamic linking or re-use of data from other documents or references. Moreover, it would beneficial if contributions from multiple on or offline collaborators could be merged automatically, or with minimal manual intervention. Lastly, knowledge workers would benefit greatly from a user interface that is adapted to present customizable interface elements based on a particular type of document or section of document the worker is editing.

SUMMARY

In accordance with the present invention, systems and methods for document processing are discussed herein. In certain embodiments, novel document processor programs may allow for a knowledge worker to concentrate on the content of a document, rather than its formatting. Such programs may separately store layout and/or typesetting information from content, allowing for their combination after the content is created.

Novel data structures and techniques are provided to permit the use of advanced version control, collaboration techniques and team workflows. User interfaces are also disclosed which dynamically adapt to a document type and/or a portion of a document being edited. Such features may significantly increase knowledge worker drafting efficiency.

In one aspect of the invention, a computer-implemented method of creating a document is provided. The method may include receiving, by a computer, a request to create a document. The request may include at least a document type. The method may also include creating, by the computer, a primary data object ("PDO") and associating, by the computer, the PDO with a document schema. The document schema may corresponding to the document type, and may include such information as allowable node data objects, allowable metadata data objects, and allowable data object relationships. The method may also include receiving, by the computer, a first metadata data object; associating, by the computer, the first metadata data object with the PDO; and receiving, by the computer, a node data object. The node data object may include a type of node, content (e.g., the text of paragraph or heading), and/or relationship information (e.g., a parent/child/sibling relationship). The method may also include determining, by the computer, the received node data object is allowed. Such determining may be based on the document schema. The method further includes associating, by the computer, the received node data object with the PDO and selecting, by the computer, a document template, based on the document type. The document template may include be selected from among multiple document templates, where each document template is associate with a document type. Each document template may include information relating to one or more of background content, program logic, output logic, and typesetting information. The method may also include creating, by the computer, a document, based on the document template, the PDO, the first metadata data object, and the node data object. The created document may be an intermediate document, which may then be interpreted and/or compiled to a rendered document, which may be stored by the computer and/or displayed. Alternatively, the created document may be a rendered document.

In another aspect of the invention, a document creation apparatus is provided. The apparatus may include a processor and a memory. The processor may be adapted to receive a request to create a document, where the request may include a document type; create a primary data object ("PDO"); and associate the PDO with a document schema, which may correspond to the document type. The processor may also be adapted to receive a first metadata data object; associate the first metadata data object with the PDO; and receive a node data object. The node data object may including a node type, content, and/or relationship information, and the processor may be adapted to associate the received node data object with the PDO. The processor may be further adapted to select a document template, based on the document type; and create a document, based on the document template, the PDO, the first metadata data object, and/or the node data object. The memory of the apparatus may be adapted to store the PDO, the metadata data object, the node data object, and the document schema.

In yet another aspect of the invention, a system for creating a document is provided. The system may include a user device and a server in communication with the user device (e.g., via a wired or wireless network.) The server may include a processor adapted to present a document management interface to the user device and receive a request to create a document from the user. The request may include a document type. The processor may also be adapted to create a primary data object ("PDO"); associate the PDO with a document schema corresponding to the document type; present a metadata data entry interface to the user device including a first indicator of an allowed metadata data object; receive an allowed metadata data object from the user device; associate the allowed metadata data object with the PDO; present a document drafting interface to the user device having a first indicator of an allowed node data object; receive an allowed node data object comprising a node type, content, and relationship information; associate the received node data object with the PDO; select a document template, based on the document type; create an intermediate document, based on the document template, the PDO, the allowed metadata data object, and/or the allowed node data object; and interpret the intermediate document to create a rendered document. The memory may be adapted to store the PDO, the allowed metadata data object, the allowed node data object, the document schema, and the intermediate document.

These and other aspects of the invention may be more clearly understood by reference to the following detailed description of the invention and the appended claims.

BRIEF DESCRIPTION OF THE DRAWINGS

The preferred embodiments of the present invention are illustrated by way of example and not limited to the following figures.

FIG. 8 shows an exemplary user interface of a document processor program presented to a user editing an interrogatory response document type.

FIG. 25 shows a screenshot of an exemplary user interface of a document management platform.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Exemplary systems and methods described herein allow for the efficient creation and/or modification of documents using novel document processor programs and/or improved document management platforms. Such programs may provide for the separation of typesetting and/or layout of a document from the drafting of content, which allows a knowledge worker to concentrate on the task at hand. Exemplary programs may comprise one or more customizable user interfaces that may adapt to optimize a user's drafting experience based on a document type and/or portion of a document that a user is editing.

Certain exemplary document creation and/or editing programs described herein may allow for the dynamic re-use of data from previously drafted documents and/or references stored on a local or non-local system. Such programs may provide a simple and easy to use interface for correcting common mistakes; provide the ability to use modern revision control operations and features; provide improved methods and processes of collaborative editing between team members, writers and reviewers, and even opposing counsel; permit the automatic merging of changes from multiple reviewers; provide functionality to automatically generate shell-type documents responsive to other documents or common needs; provide functionality to file, serve, email, or otherwise deliver a drafted document directly to its intended recipient; and/or permit use in many of the varied circumstances where knowledge workers now conduct business, including online, offline, in low bandwidth situations, via mobile devices, and using non-traditional input means including but not limited to therapeutic or voice input.

Figure 1:
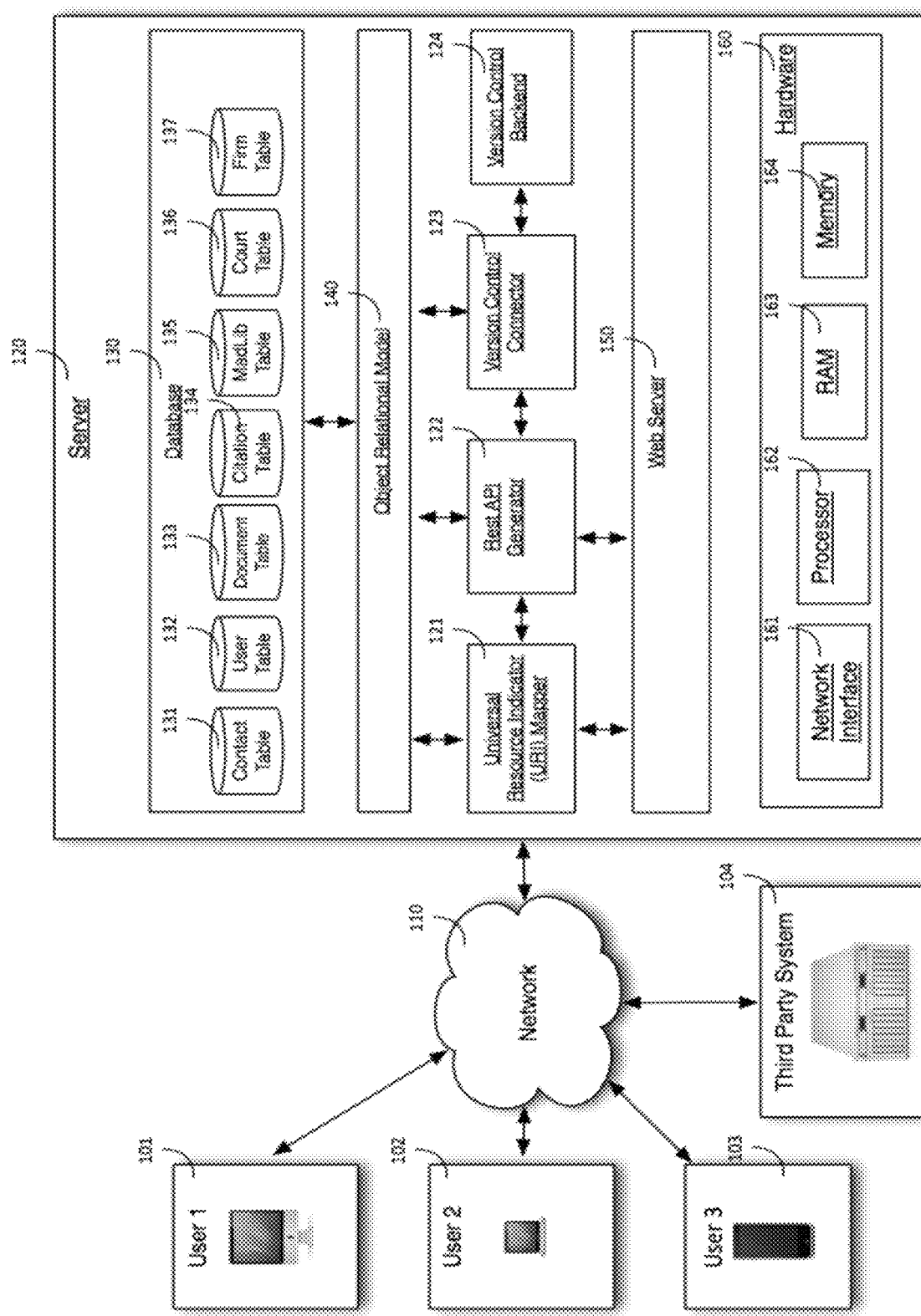
FIG. 1 shows a system architecture according to an exemplary embodiment.

Referring to FIG. 1, an exemplary system for creating, editing, and/or storing documents is illustrated. As shown, the system comprises any number of users 101, 102, 103 accessing a server 120 via a network 110 (e.g., Internet, LAN, cellular, intranet, etc.).

In one embodiment, a document processor program and/or a document management platform (discussed in detail below) may be entirely or partially implemented on one or more servers comprising hardware 160 such as any number of processors 162, RAM 163 and internal or external memory 164. The server may include a network interface 161 such that it may access the network 110 to send or receive information.

As shown, at least one database 130 may be accessed by the server. Although shown as internal to the server 120, it will be appreciated that the database may be accessed by the server over a network or via another wired or wireless connection. The server may store desired or required information in the database and may access the same to retrieve the information.

As shown, the database 130 may include a number of tables. Exemplary tables includes but are not limited to a contact table 131, a user table 132, a document table 133, a citation table 134, a madlib table 135, a court table 136, and a firm table 137.

In one embodiment, a contact table 131 stores contact information such as but not limited to first and last name, address, phone number, email address, website, and/or pictures. The contact table may store contact information for one or more of a user's personal contacts and/or may store global contact information for one or more of a firm's contacts.

A user table 132 may store identification information (e.g., username, password), user preference information, user contact information, etc. In one embodiment, the user table may also store billing information and administrative privileges information.

As discussed in detail below, a document table 133 may store data objects, such as but not limited to primary data objects, metadata data objects, node data objects, relationships between data objects, content, etc.

A madlib table 135 may store user or system created re-usable content for use in preparing documents. Although not shown, a rules table may be implemented to store rules for any number of document types, including but not limited to schema of available data object types, and/or schema of allowable parent/child node data object pairs. A rules table may also store formatting rules for each available node of a document type and for each document type.

A court table 136 may store information relating to one or more US or international courts, panels or governing bodies. Information may include, for example, address, judge information, data relating to historical decisions, and/or court formatting requirements for each document type.

A firm table 137 may store information relating to one or more law firms or in-house counsel. Information may include, for example, addresses, document preferences and templates, names, and the like.

It will be appreciated that the illustrated tables are only exemplary and the data may be stored in a single database or any number of databases. The exemplary tables may be refreshed in real-time or near real time.

As shown, a database may be in communication with an object relational mapping ("ORM") 140, also known as an object relational model or object-relational database management system. Although shown as internal to the server, it will be appreciated that the ORM may be accessed by the server over the network or via physical connection.

The ORM may be in communication with one or more of the following: a Universal Resource Indicator (URI) mapper 121, a RestAPI generator 122, and a version control module 123. First, the URI mapper may map a URI into a pointer to an internal program, view, logic, or presentation of data within the system, based on one or more rules of a matching object specified in a collection of mapping objects. The matching object may be a regular expression. The URI mapper may be in communication with a web server 150.

The Rest API generator 122 may be in communication with a web server 150 as to send and/or receive data to/from client devices (101, 102, 103) communicating with the server using HTTP and/or HTTPS. The Rest API generator may prepare data stored in the database 130 for delivery to a client device or may prepare data received from a client device for storage in the database. The Rest API may be capable of translating between formats including, but not limited to JSON, XML, CSV, and the like. The Rest API may be capable of automatically generating URIs based upon data structures observed in the ORM for access by client devices.

A version control connector or module ("VCM") 123 may be placed in communication with a version control backend system ("VCS") 124 (collectively, a version control platform ("VCP")). As discussed below in reference to FIGS. 16-21, the VCP may be placed in communication with a document processor program and/or a document management platform to allow for collaborative editing of documents.

A web server 150 may be adapted to deliver web pages on request to users using the Hypertext Transfer Protocol (HTTP and/or HTTPS) or similar protocols. This allows for delivery of HTML documents and any additional content that may be included by a document, such as images, style sheets and scripts.

A user or client device (101, 102, 103) may employ a web browser or similar client application to engage in communication with a web server 150. For example, a client application may make a request for a specific resource using HTTP/HTTPS and the web server may respond with the content of that resource or an error message if unable to do so. The resource may be data or a file stored in a database 130. As discussed in detail below, the web server can receive content from a user, possibly using HTTP/HTTPS, such as but not limited to data objects that make up a document.

In certain embodiments, a user may access the server 120 (i.e., an application running on the server) through a user access device (101, 102, 103) connected to a network 110. A user access device may be any device capable of accessing the server such as by running a client application or other software, like a web browser or web-browser-like application. In one embodiment, a user access device may comprise, for example, an input/output device, a display, a processor, memory, and/or audio equipment such that the user may utilize the user access device to create and/or edit documents using the word processor. Exemplary user access devices include, but are not limited to, general purpose computers, laptops, cell phones, smart phones, personal digital assistants, televisions, tablets, and the like. Once an access device establishes a connection to the server, such as through the network, the user may log into the system and access the document processor program.

In one embodiment, the server may be connected to one or more third party systems 104 via the network 110. Third party systems may store information in one or more databases that may be accessed by a document processor program to populate, store or file documents. Third party systems may include, but are not limited to, United States Patent and Trademark Office (USPTO) patent databases (e.g., PAIR), USPTO trademark databases (TESS), EDGAR, PACER, individual court systems, E-discovery platforms, and/or private firm servers including a firm's matter management systems, human resources' systems, traditional document management systems, or others.

The server 120 may be capable of populating database tables 130, with or without user interaction, by communicating with third party systems 104. For example, the server may connect, translate, aggregate, and/or convert third party information into document, contact, or matter data structures. The server may be capable of automatically notifying users of the availability of new, modified, and/or deleted data within third party systems, and of the automatic population of database tables, such as but not limited to documents and/or portions of documents. The server may be capable of communicating user-populated and/or automatically-populated database table entries (e.g., contacts, matter information, transaction information, deal information, prosecution information, case information, documents and/or portions of documents) to third party systems, and may notify users of such communications.

It will be recognized that any other suitable software or hardware or combinations thereof may be used with the exemplary document creation/editing and/or storage applications disclosed herein. Moreover, such applications may be implemented at any suitable location in FIG. 1, such as but not limited to at the server 120, a third party system 104, at the user access device (101, 102, 103) or at a location not pictured.

Figure 2:
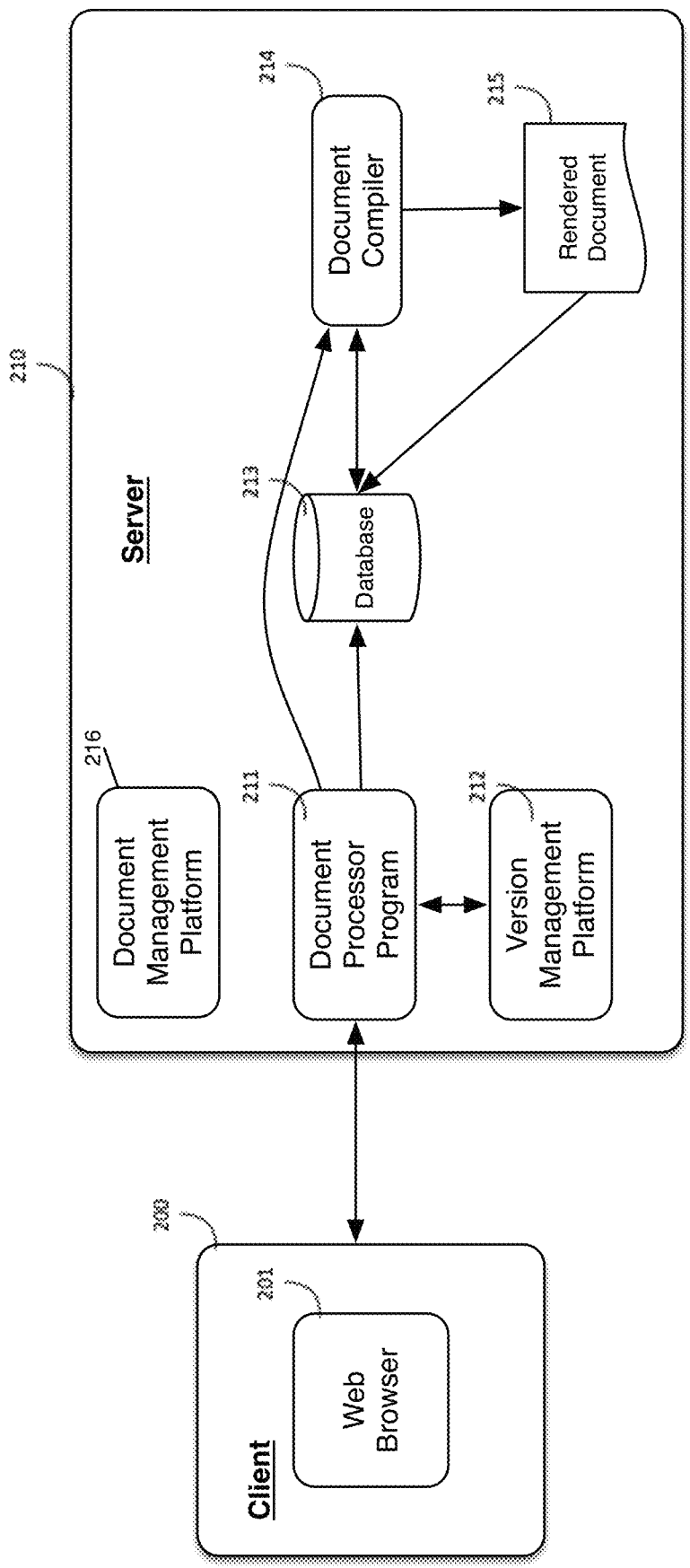
FIG. 2 shows a system architecture according to an exemplary embodiment.

Referring to FIG. 2, an exemplary system is illustrated comprising a user or client device 200 in communication with a server 210. As shown, the client 200 may have an application, such as but not limited to a web browser 201, running thereon. The client application may be adapted to communicate with a document processor program running on a server over, for example, a network. Such a configuration may allow users of a client application to edit documents from any location that allows for access to the server and/or to use any computing platform.

An exemplary client application may comprise HTML data, images, icons, and/or executable code. The executable code may be composed in JavaScript, ECMAscript, coffeescript, python, or other programming languages suitable for execution within the client application, or translation into a client application executable form.

The client application is typically adapted to present various user interfaces to a user. Such user interfaces may be based on information sent by the document processor program 211, and may allow the user to send and receive data objects, such as but not limited to metadata, nodes, contacts, relationships, and/or any other data relevant to a document being edited or created by a document processor program. The client application may allow the user to create and/or manipulate data objects via various user interfaces, and to communicate the same to the server.

In certain embodiments, the document processor program 211 may be in communication with a document management platform 216 (discussed in detail below), such that documents may be accessed and/or stored in the document management platform.

It will be apparent to one of ordinary skill in the art that, in certain embodiments, any of the functionality of the client may be incorporated into the server, and vice versa. Likewise, any functionality of a client application may be incorporated into a browser-based client, and such embodiments are intended to be fully within the scope of the invention. For example, a browser-based client application could be configured for offline work by adding local storage capability, and a native application could be distributed for various native platforms via software layer which executes the browser-based program on the native platform. A native program may be preferred in situations where the user desires to work offline (i.e., when the application is not in communication with the document processor program).

In the illustrated embodiment, the document processor program 211 runs on the server and receives communications from the client application 201. The document processor program may be in communication with a database 213 and may be in further communication with a document management platform 216, document compiler 214, and/or a version management platform 212.

The document processor program 211 may be accessed by a user of a client application to prepare a document having a document type. Exemplary document types include, but are not limited to, letters, briefs, pleadings, discovery requests and responses, patents, patent applications, office actions, office action responses, contracts, financial documents, due diligence documents, securities registration and filing documents, complex transactional documents, and any other document created and/or edited by knowledge workers and/or professionals.

Documents created and edited by a document processor program are not typically represented, in their native form, by single unitary objects, single files, or single streams of elements in a markup language, although they could be translated into such forms including by the use of a document compiler (explained below). Rather, as used herein, a document created by an exemplary document processor program refers to a plurality of related data objects, each data object having a particular data object type. Data object types may include, but are not limited to, primary data objects, relationship data objects, contact data objects, and node data objects.

In one embodiment, a document may comprise a primary data object ("PDO") that associates with (i.e., stores and/or links to directly or indirectly) other data objects. The PDO, like other data objects, may comprise metadata, such as but not limited to fields and/or other information. The PDO may be read and/or interpreted by a document processor program 211 to aggregate each of the data objects that make up a particular document. In this way, the document processor program can model an entire document as well as the functional and/or professional context of that document's creation, use, and purpose.

By way of non-limiting example, a letter PDO can associate with metadata about the letter such as: (1) contact data objects (e.g., contacts, clients, matters, cases and/or actions); (2) node data objects that include structure and/or content of the letter; and (3) relationship data objects (e.g., recipient, sender, signing attorneys, client, matter, action), which include information relating to the relationships between each contact data object and/or node data object. The letter PDO may be read by a document processor program, and each data object may be aggregated to model the document as a whole.

Thus, for example, drafting a legal document may be made more powerful and efficient by modeling of a case, matter, or action to which the document is relevant or related. Likewise, a document processing system used for drafting a medical document could model information relevant to the medical context such as, for example, patient records, doctor records, diagnoses, test results, etc. A document processing system used for drafting documents in a military context could model relevant information such as personnel data, names, ranks, unit assignments, deployment histories and schedules, ship or aircraft information, equipment assignments or other quartermaster type data, and so on. A document processing system used for drafting business documents could model information relevant to the business and the types of transactions the business engages in as well as the other entities that the business deals with such as other businesses.

In one embodiment, data objects including PDO's and those received from a client may be stored in one or more databases, filesystems, and/or other storage systems. In this way, the data objects may be retrieved at a later time by the document processor program or the document compiler. For example, data objects may be stored in a document management platform, for access, review, editing and/or linking of data objects to a new document.

Data objects retrieved by a document processor program may be communicated to the client application. In one embodiment, communication between a client application and a document processor program may involve the use of a translation and/or serialization module. A serialization module can convert an object from an in-memory representation to a serialized representation suitable for transmission via HTTP or another transport mechanism. For example, the serialization module may convert a data object (e.g., a contact data object or node data object) from a native Python, Ruby, or Java in-memory representation into a JSON string for communication over the client-to-server transport protocol.

Communications between the client application and the server may be of full featured datasets, or may only include revisions of a prior version of a data object to a new version (i.e., a "delta"). Communicating merely the delta may be advantageous from a bandwidth perspective.

Similarly, communications of data objects between the client and the server may be continuous and automatic, or may be user-triggered. For example, the user may click a button, causing the client to send one or more data objects to the server. Alternately, a client application may automatically send updates to the server periodically without prompting by a user. As discussed in detail below, if a client sends data autonomously, the server may be configured to transmit this data, either automatically or on request, to additional clients, thereby enabling multi-user online concurrent editing of the same document.

Interaction between a document processor program and a database may be mediated by an ORM (FIG. 1 at 140). The ORM may eliminate the need for the user of the system to query or otherwise directly interact with the database, by presenting information stored in the database as a data object accessible by the document processor program, for example in tags, in the document compiler, in document compiler templates, and in modeling the relationship between the various data objects in the system.

In one embodiment, a client application may verify data before it is sent to ensure that the data complies with any rules proscribed for a specific type of data object. Likewise, a server may verify or validate any received data. For example, a structure, type, order, and/or other characteristic metadata of a received node data object may be verified against a stored schema to ensure that the data object is valid, before being stored.

As shown in FIG. 2, the document processor program 211 may also be in communication with a document compiler program 214. The document compiler may be described as a subsystem that translates a document from the native representation of the document processor program into another format. For example, the document compiler 214 may aggregate and/or translate a document (i.e., related data objects created by a document processor program) into a rendered document 215 having a single file format. Exemplary rendered documents have a file format such as but not limited to DOCX, DOC, XLS, KEY, TEX or PPT. Alternately, the document compiler may translate a document into a rendered or intermediate document having an HTML, XHTML, XML, or another markup language format, which may then be further processed to a rendered document. The document compiler may be used to translate documents into a format that is easily viewable or printable such as PDF, PostScript, or another format which may be printed or viewed on screen.

In one embodiment, a request to prepare a rendered document may be sent to the document compiler by a document processor program. The request may include, for example, a document identifier, which instructs the document compiler where to obtain the data objects comprising the document. In one preferred embodiment, the document identifier will include information about the location of a PDO or a PDO itself, however the document identifier may be an index value to a database table, an index value and the name of a table, one or more URI endpoints where some or all of the document may be retrieved, or some other means of identifying and/or locating the data objects. The document compiler 214 may then retrieve the PDO from the document processor program or database. If the PDO contains references to other data objects, such data objects may also be retrieved by the document compiler.

A document compiler 214 may be implemented with a template system (not shown), such that one document compiler module can compile various document types by selecting a document template from one or more document templates stored on the server 210 or elsewhere. The document compiler may select and/or load a document template corresponding to a particular document type. For example, a letter type document may be compiled by passing a letter template to the document compiler, while a patent type document may be compiled by passing a patent template to the document compiler. Such templates may be stored in the filesystem, in the database 213, in an external database, or may be constructed dynamically at runtime. Document templates may be provided with the system, or the system may provide a user interface whereby users may create or edit their own templates (e.g., via a document management platform 216).

A document template may comprise a mixture of background content, program logic and/or output logic. The background content of a template refers to those portions of the desired output that are always present, regardless of the specific content of any document. One example of background content of a letter template is a letterhead. The program logic of a template may enable the template to iterate over the data objects of a document, access data contained or referenced by those data objects, retrieve additional data objects, and/or prepare document compiler data for use by output logic. The output logic of a template may be designed to format and/or create meaningful output from the program logic or the document compiler data by injecting such logic or data into the background content of the template.

By way of a non-limiting example, a document compiler may be implemented using a TeX based typesetting system combined with a generic templating system such as the Django templating system, Jinja, AngularJS, or any other templating system suitable for creating a template which is a mixture of background content, program logic, and/or output logic; and injecting data objects into said template. A template may be a mixture of Django or Jinja template tags, combined with TeX or LaTeX background content and macros.

In some embodiments, the template may be constructed by beginning with a sample document in the desired output format or intermediate output format (e.g., LaTeX) that compiles, prints, and/or appears correctly; and replacing the content or metadata portions of the document with template tags and TeX or LaTeX macros that cause the TeX or LaTeX processor to properly parse and format node or other data object content that comprises the document. In this way, the document compiler may create an intermediate output format document (e.g., a TeX or LaTeX document), and from that document a rendered document having the desired output file format (e.g., a PDF or DOCX document).

As shown, the document processor program also may be in communication with a VMP 212. The VMP can comprise a VCS, a VCM, and/or a storage subsystem. However, in certain embodiments, the VMP may employ the same storage subsystem or systems, including local or network file systems and/or databases 213, as the document processor program. In one embodiment, the VMP 212 may be employed by the document processor program to manage various aspects of version control and change management (discussed in detail below). The VMP may be in communication with a document management platform 216, such that a user may access multiple versions of a document.

Figure 3:
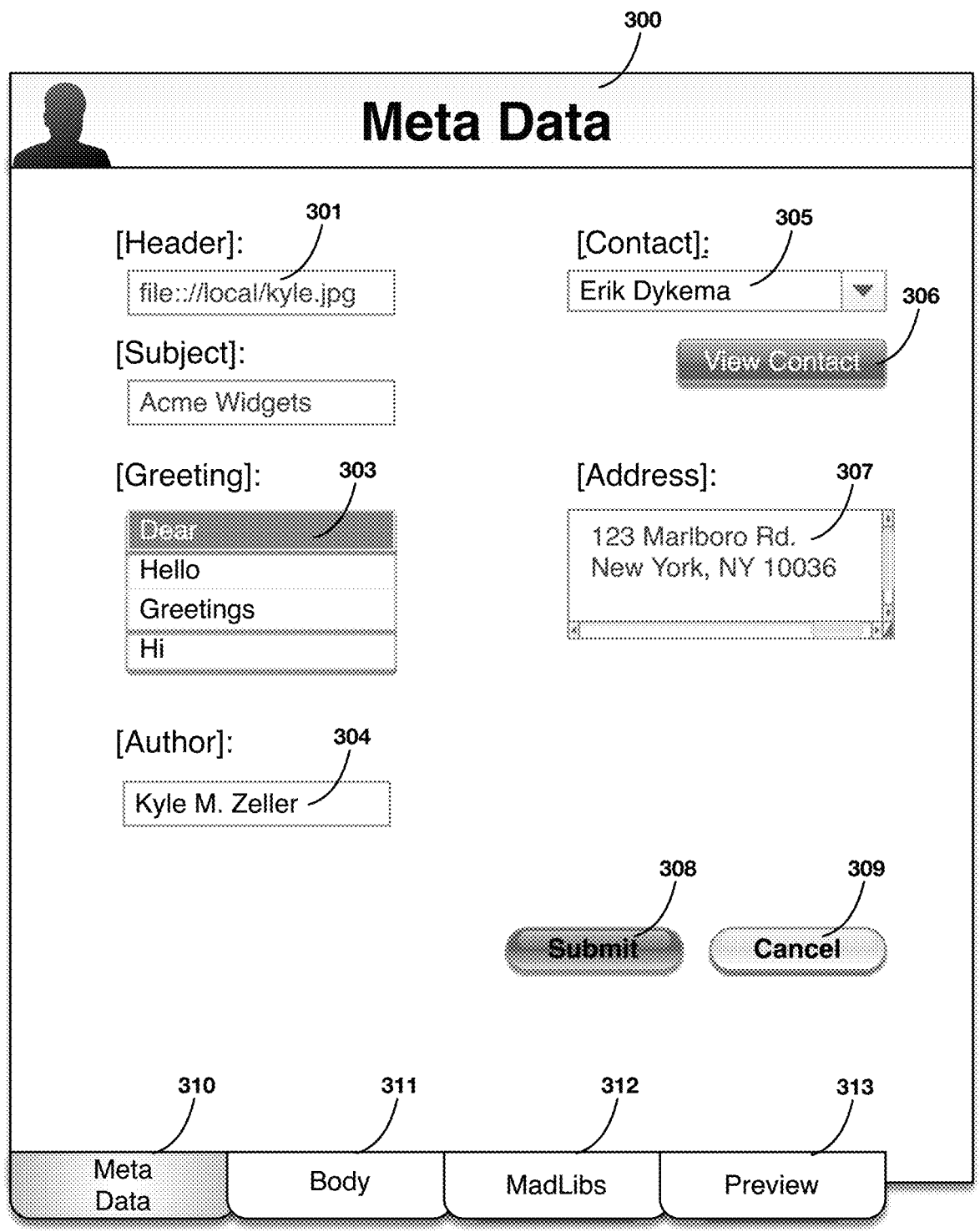
FIG. 3 shows an exemplary user interface of a document processor program presented to a user editing a letter document type.

Referring to FIG. 3, a document creation and/or editing user interface is presented to a user of a client application. A document processor program may present a user interface (e.g., one or more webpages) to a user to allow the user to create and edit a document comprising related data objects. A user interface may include document-type specific information generated at the server and may also include information generated at the client device. As discussed above, various interfaces may be presented to a user depending on the document type being created/edited. Exemplary user interfaces may include, but are not limited to, a document metadata interface 300, an editor interface, a client interface, a matter interface, a contact interface, a party interface, a counsel interface, a court interface, a document filing interface, a printing interface, a patent interface, and other interfaces. The user interface may provide a mechanism for the user to switch back and forth between various interfaces such as with tabs or other controls, for example a MetaData tab 310, a Body tab 311, a MadLibs tab 312, and a Preview tab 313.

In the illustrated embodiment, the document processor program prompts a user to enter metadata such that it may be stored in any number of metadata data objects in order to create and/or edit a letter document. As shown, the requested metadata is document-type dependent, and includes such information as a path for a firm logo or banner image 301, a subject 302, a greeting 303, an author 304, a contact 305, and/or a contact address 307. Optionally, the user interface may enable the user to edit a related data object such as a contact directly from within the document editing page 306, rather than causing them to enter another menu system to do so.

Each requested metadata data object can be manually entered by a user (e.g., 302) or may be selected from a number of choices presented to the user (e.g., 303). Such choices may be automatically populated by the system based on recently prepared documents or can be static (i.e., programmed into the system). Choices, or a selection of possible choices, may also be presented to the user based on the user's relationship to other data objects in the system (discussed in detail below).

The metadata data objects may be stored in a database and associated with the document. At any time during document drafting, the user may navigate to the metadata entry page 310, and update the metadata. Changes may be saved by, for example, pressing the submit button 308. Alternately, the system may save changed content on its own, without requiring the user to press the submit button, for example if the user navigates away from the metadata entry page. If a user makes changes that he does not want to store, he can press the cancel button 309 and such changes may be discarded.

In certain embodiments, data objects, such as but not limited to metadata, document content, and/or document structure, may be retrieved from a third party system. Such data may be automatically updated in real-time or near real time and stored on the database. As one example, an office action response may require meta data relating to a patent examiner's name, the USPTO address, a patent application title, information relating to a prior art reference, or any number of additional information residing on a USPTO system, a search engine, GOOGLE PATENTS™ patent database, or another electronic system. Rather than requiring a knowledge-worker to manually search for and enter this information, the system may automatically retrieve such information and store the same on the server database (e.g., by accessing a patent application XML, file). The stored data object may be associated with a particular document and/or may be presented as a choice within a user interface.

Figure 4:
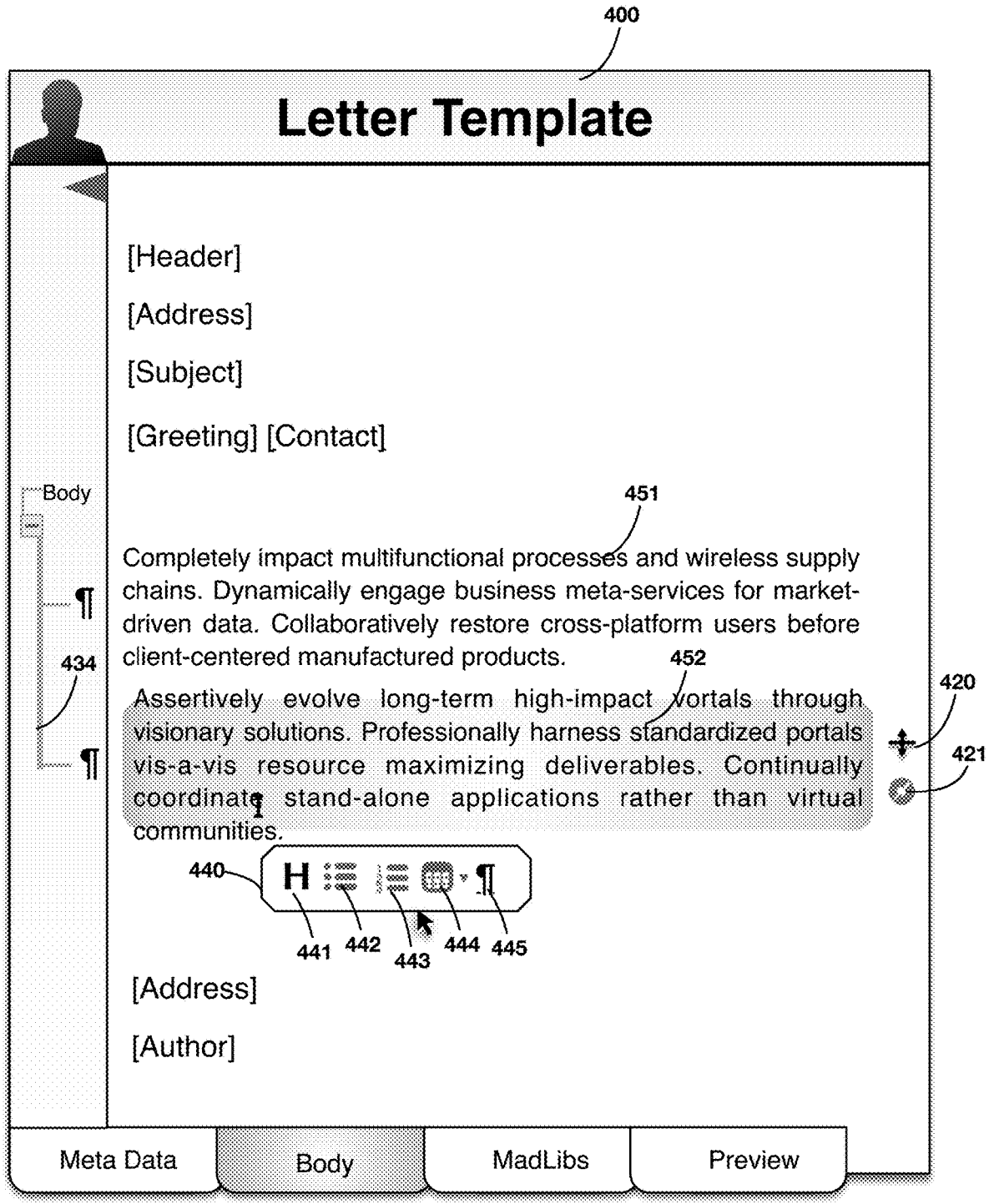
FIG. 4 shows an exemplary user interface of a document processor program presented to a user editing a letter document type.

Referring to FIG. 4, a document editing page 400 of an exemplary document processor program is illustrated. As shown, the editing page includes an editable text entry field where a user may enter content of a body portion of a document. In operation a user may start with a blank entry field and may begin typing text into the document, or speaking into an input device. The text, in the form of alpha-numeric characters and various symbols, may be stored into either pre-defined or user generated data object types (e.g., node data object and madlib data object types) based on the document type.

In a preferred embodiment, the document processor program is different from "free-form" word processing programs in that a user may only create certain node data objects that are specific to each document type and that have a clearly defined hierarchy (schema). In other words, a user can only add content to a document if that type of content is permitted within a selected node type, and a user can only add a node if the particular node type is permitted at that location with respect to the structure of the document.

In the illustrated letter-type document, a user may only be allowed to enter headers 441, paragraphs 445, tables 444, numbered lists 443, and/or ordered lists 442. Accordingly, when a user desires to add a new node to the document, the user may select the node type from a list of available nodes presented to the user 440. As depicted, available node types may include heading 441, unnumbered list 442, numbered list 443, table 444, and paragraph 445. The list may appear when a user moves a cursor over the node that is currently being edited or over a node-type menu, or may always be shown (unless hidden by the user) during document editing/creation.

In one embodiment a list of available nodes may include all nodes that may be added in a particular document-type. It will be appreciated that the types of nodes available for insertion at a particular location in a document may be stored in a document schema, and may depend on: (1) the type of document; (2) the section of the document where the node is to be inserted (e.g., a body section, footnote section, signature block, etc.) and/or (3) one or more nodes that precede the location where the node is to be created. As an example, although a particular node type may be available for use in a certain document type, and may be available in a particular document section, the node may still not be added if it is not permitted as a sibling or child of a node that immediately precedes it.

In the illustrated embodiment, the letter document may permit numbered list nodes in its body, but according to a particular schema, a numbered list node may not be permitted as a child node of a header node. As another example, a patent document may generally allow a paragraph node in its body section, but may not allow a paragraph node in its claims section. A schema of available node types for each document type may be stored on the system, and/or a plurality of document-specific schemas may be stored and/or accessed by the system. Exemplary schemas are presented in Appendix A and B.

In one embodiment, the system may be programmed to create a default "next node type" when a user presses a particular key. For example, a new paragraph node may be created when the user presses the return key within a paragraph node, as to avoid requiring the user to click a "paragraph node" button within a list of available nodes. The default next node type may vary depending on one or more of: the document type, document section, and the parent node.

The system may be programmed to create a new node of a particular type when a user enters a combination of characters. Indeed, the system may include an auto-complete feature that suggests available node types when such a combination of characters is entered.

In one embodiment, the node type of one or more nodes may be visually presented to the user. As an example, the illustrated embodiment shows paragraph symbols 434 to the left of the first paragraph node 451 and second paragraph node 452. If a user created a third paragraph node, the document processor program could display a paragraph symbol next to the third paragraph node to inform the user of the node type. Alternately, if the user creates a header node, the program can display a different symbol to inform the user of the type of node at that location.

A "delete button" 421 or similar functionality may be provided to users of the system. A user may select the delete button to completely remove the selected node. A "move button" 420 or similar functionality may be provided to users of the system. A user may select the move button and drag the node up or down to change its order with respect to the siblings of that node. Alternately, two or more move buttons may be shown to the user and the user may click an "up" button to move a node up, and a "down" button to move a node down.

Because the user interface of the document processor program need not deal with highly complex visual formatting commands (e.g. fonts, sizes, margins, layout, and other typesetting minutiae), it may be greatly simplified and may present only a minimum number of options to the user while still enabling the user to quickly and efficiently create professionally typeset documents. Furthermore, because there are fewer options, each of the possible options available to the user can optionally be visible on the screen as a button or other control. In other words, because the present invention enables complete editing of a document with a low number of commands, each of the functionalities enabled by a command can be made available via all of the available input methods via an input mapping schema. Thus, as an example, for each command presented to the user as a button on the screen, that control option can also be made available via keystroke combinations, mouse or trackpad gestures, or other input signals.

It will be appreciated that because the document processor program can generate professionally formatted and typeset documents, but with a greatly simplified user interface, the document processor program may be useful in applications where the simplicity of the user interface is of the highest priority. For these reasons the document processor program may be well suited for use by persons with disabilities, children and the elderly. In particular, persons who, due to physical limitations, cannot type or use a mouse, or other traditional input devices could benefit from a combination device including the document processing system and a customized user input device incorporating small motions or tracking of the hands, eyes, tongue, breath, or even brainwaves or other biofeedback mechanisms.

Figure 5:
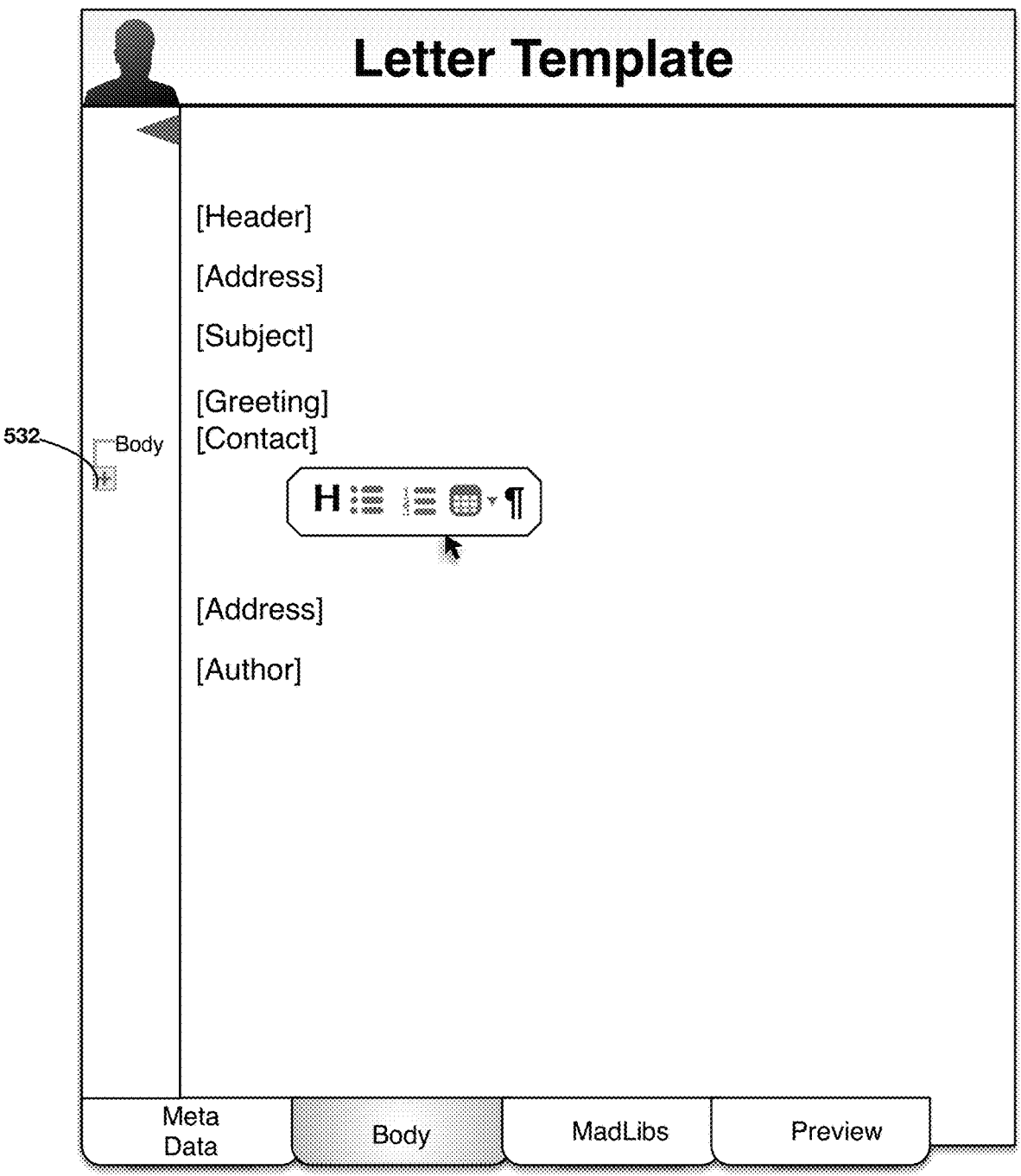
FIG. 5 shows an exemplary user interface of a document processor program presented to a user editing a letter document type.

In one embodiment, as shown in FIG. 5, a user may collapse/expand the illustrated first and second paragraph nodes by activating a collapse/expand button 532 located on a side of a document editing page. In this way, a user can zoom in or out on a specific node or group of nodes to make edits or for review.

Figure 6:
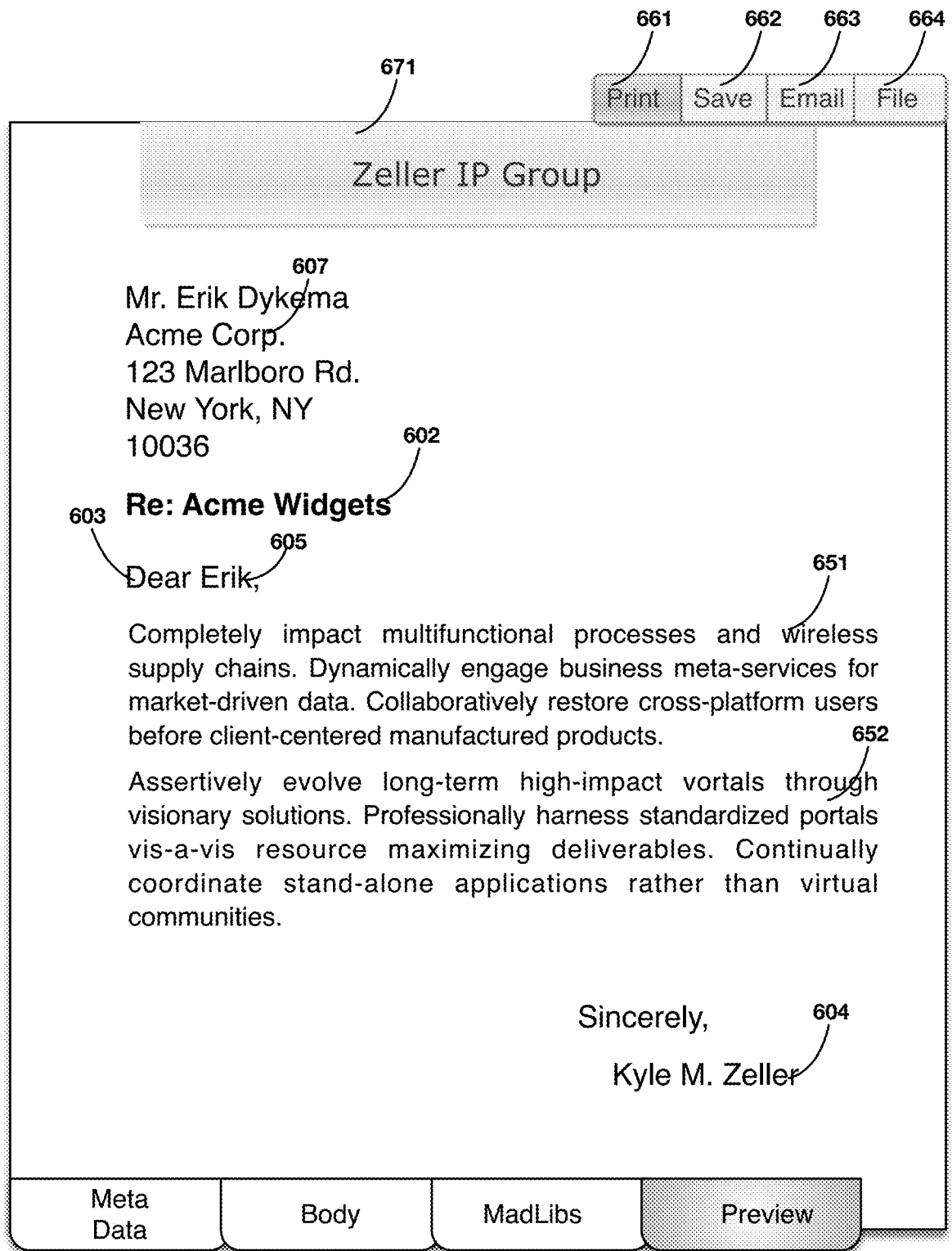
FIG. 6 shows an exemplary user interface of a document processor program presented to a user editing a letter document type.

Referring to FIG. 6, an exemplary document processor program may employ a document compiler to render the document into a visual format such as PDF for preview by the user. The rendered document may incorporate the body of the document 651, 652, as well as metadata 602, 603, 604, 605, 607, 671 data retrieved from third party sources, and/or data represented in the document processing system by other data objects. Each piece of metadata can be formatted and placed into an appropriate position within a rendered document depending on the document type and a typesetting template employed by the document compiler. The preview may be automatically regenerated each time one or more of the elements of the document change.

As shown, a user may print 661 the rendered PDF, save 662 the same either locally or on the server, or email 663 the same to one or more contacts. In one exemplary embodiment, the user may file 664 the rendered PDF with a third party system. For example, the system may access electronic filing systems such as court or patent office filing systems, or even a third party signing, printing and/or mailing service, login using the user's credentials, and file or store the document on behalf of the user. This ability to automatically transmit the document to a third party service enables, for example, a method of doing business including providing the service of receiving an electronic transmission of a professional document, receiving the metadata necessary to address said document, allowing for a party to sign the document, either transmitting the document on behalf of the user or printing the document to a paper copy, causing said paper copy to be delivered unto the recipient, obtaining a signature of the recipient, storing a signed copy of the document in the system, and/or transmitting a signed copy of the document to all parties.

Figure 7:
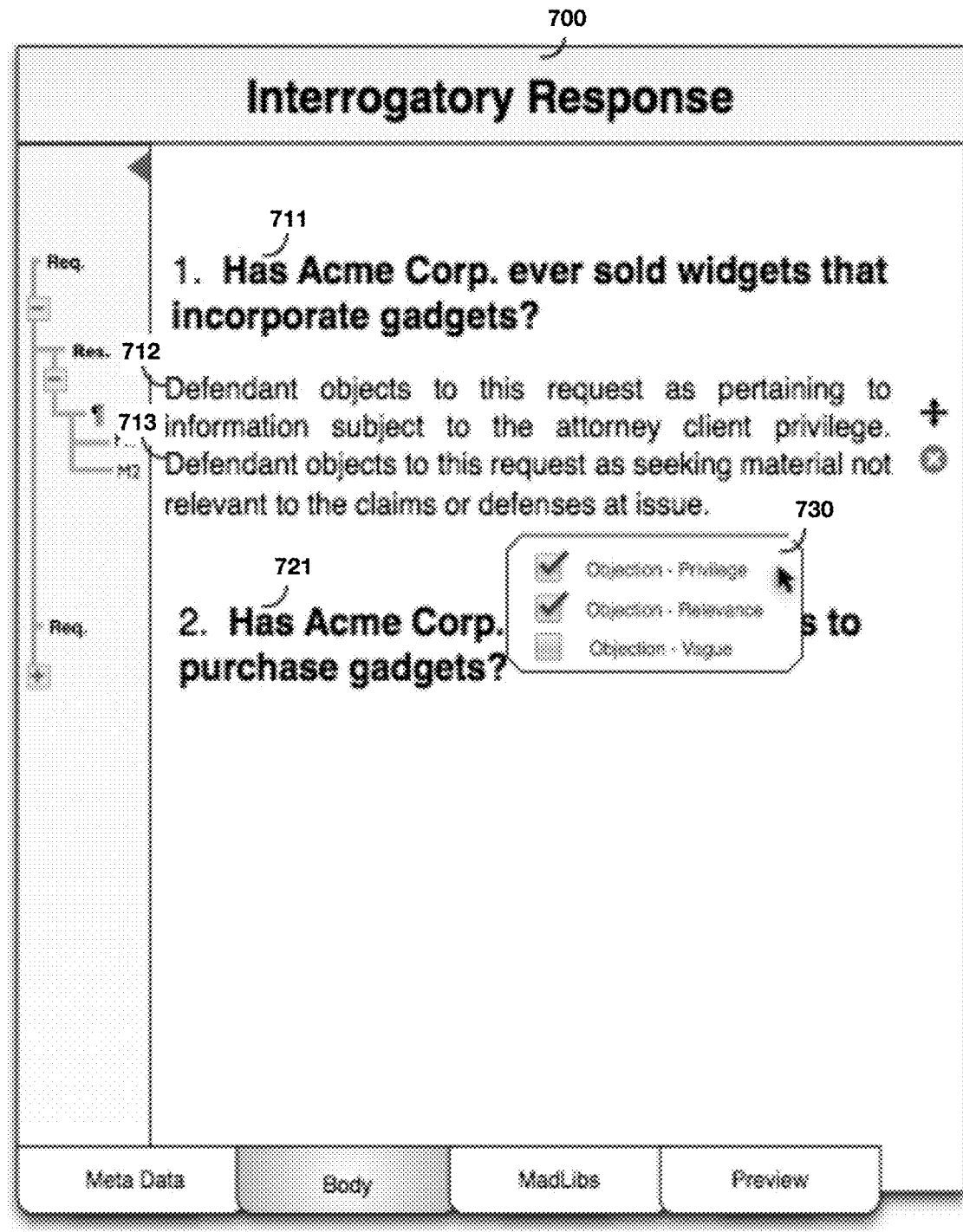
FIG. 7 shows an exemplary user interface of a document processor program presented to a user editing an interrogatory response document type.

Referring to FIG. 7, an exemplary document processor program user interface for editing a body section of an interrogatory response document is illustrated 700. As shown, a number of specific nodes are present in the interrogatory response, including a first request-type node including the content of a first interrogatory request 711, an objection-type parent node having a first child node 712 and a second child node 713, and a second request-type node including the content of a second interrogatory request 721. The interrogatory request node may contain the content of the request, or it may be a link to the interrogatory request in another document.

In this way, a method for drafting a responsive document is enabled by this system, which involves first modeling the requesting document in the system, including modeling each of the important sections and components such as instructions, definitions, and requests of the requesting document. Then, the user may use a function of the system to automatically generate a responsive document from the requesting document.

The responsive document may automatically incorporate the important sections and elements of the requesting document; but re-formatted and/or presented in such a way as to be appropriate for a user of the system to easily draft responsive content. This inventive method could be adapted to the drafting of responses to other types of requesting documents, for example, letters, patent applications, office actions, replies, sur-replies, motion responses, and any other document which is drafted in response to, and potentially may inherit some content and/or metadata from, the requesting document.

In the pictured embodiment, a list of available node types may be presented to a user, and such list may be based on the document type ("interrogatory response"), the section of the document ("body") and/or the node that precedes the location where the node is to be created. The list of available node types may differ from that of the letter in FIG. 4, because a letter document has a different node schema associated with it than that of an interrogatory response document. For example, an interrogatory response may generally include such types as requests, objections, paragraphs, tables, numbered lists, and/or ordered lists. Thus, a user can not add a patent claim node, for example, as it does not fall within the allowed node types of an interrogatory response document.

Continuing the example, although ordered lists may be generally allowed within an interrogatory response, a user may not be permitted to create a numbered paragraph node as a direct child of an objection node if a corresponding schema does not specify that combination as allowed. Rather, if so specified in the schema, an objection node may only accept a paragraph node or an ordered list node as its direct child, and a user wishing to insert a numbered paragraph may be required to first insert an ordered list node, and then a numbered paragraph as a child of the ordered list node. Accordingly, the list of available node types 730 presented when the user is editing the objection node only includes child objection nodes (i.e., objection for privilege, objection for relevance, and objection for vagueness.)

As shown, the list may appear when a user moves a cursor over the node that is currently being edited or may always be shown (unless hidden by the user) during document editing/creation. In one embodiment, a list of available node types may displayed as a menu of selectable options. When a user toggles a node-type option, a new node may be created and stored within a database. The content of the newly created node may be automatically added.

For example, as shown in FIG. 8, when the selectable box for a vagueness objection 833 is activated, clicked or toggled, the document processor program automatically creates an objection child node having pre-determined text stored therein 814. The content of the node may be displayed to the user, and in the picture embodiment the selection of the vagueness objection node displays the following sentence, "Defendant objects to this request as overly vague." Alternately, the user interface may not show the content of the nodes at all, but may rather simply display a field of checkboxes to the user, thus minimizing the amount of clutter and unnecessary content on the screen.

Figure 9:
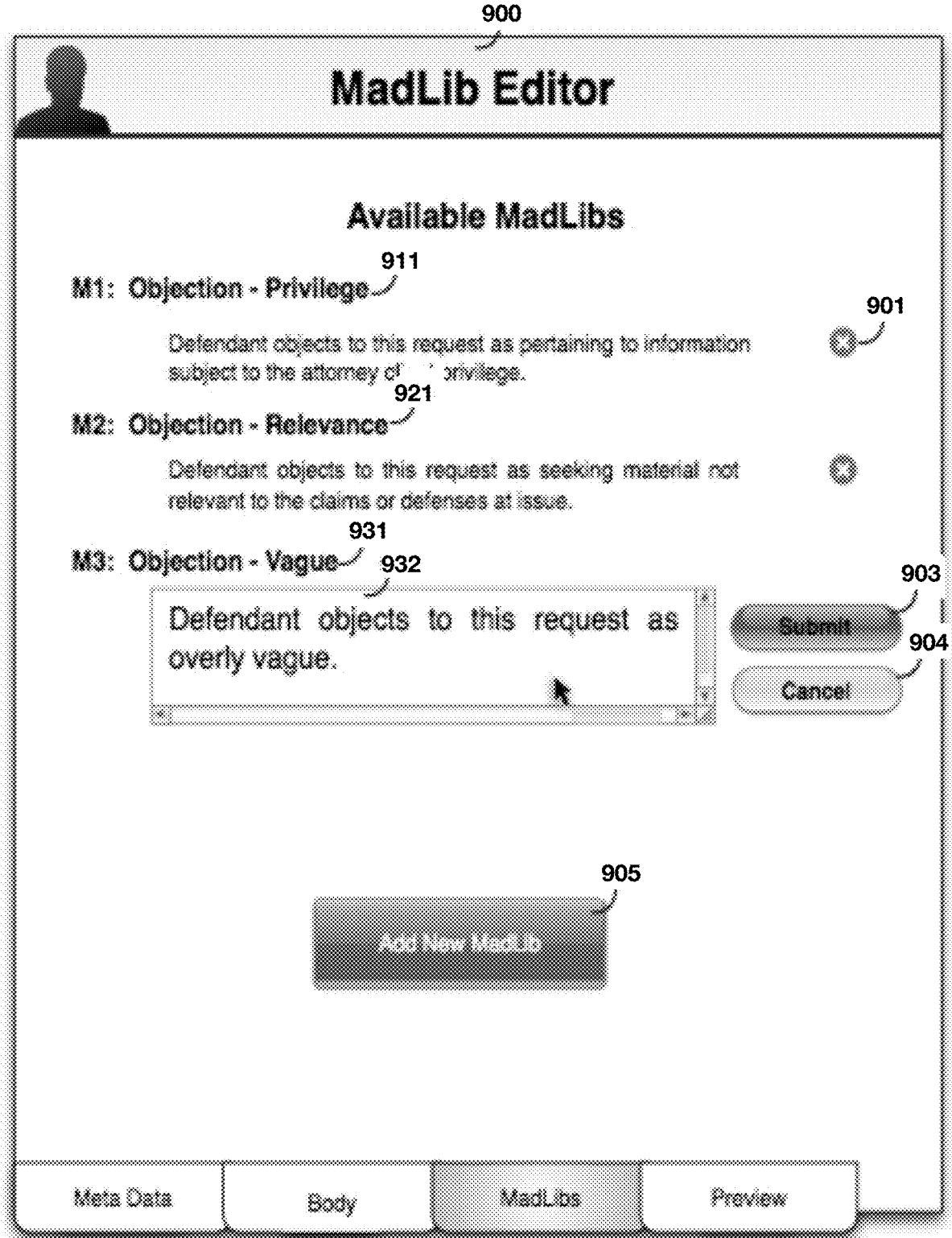
FIG. 9 shows an exemplary user interface of a document processor program presented to a user editing an interrogatory response document type.

Referring to FIG. 9, an exemplary user interface for creating user-defined or system-defined data objects (referred to herein as a "madlib") is illustrated 900. As shown, a first madlib 911 and second madlib 921 have been created by a user. A third madlib 931 is being defined by a user.

In one embodiment, a user may create a new madlib node by selecting the "add new madlib" button 905. The user may then be prompted for a title, context, and/or metadata of a new madlib. Once the user has entered the appropriate information 932, the madlib may be saved by the system either automatically or when the user presses the "submit" button 903. If a user makes a mistake or changes his mind about creating a new madlib data object, he may select the "cancel" button 904. Moreover, any madlib may be deleted from the system by, for example, selecting a corresponding delete button 901.

Once a madlib data object is created and stored by the system, it may be associated with a document. For example, FIG. 8 shows that the madlibs created in the madlib editor of FIG. 9 may be selectable during editing. A user may select the madlib to associate it with a node of the document. Accordingly, the content stored or referenced by the madlib may be displayed by the document processor program to a user.

A madlib may be added to or associated with a document at multiple locations, and each instance of the madlib may be dynamically updated when the user updates the madlib on the madlib creation/editing page. Alternately, in some embodiments, it may be unnecessary to update an instance of a madlib used in a document, because the madlib content is merely referenced and not copied into the document. In this way, a user who includes a madlib in multiple locations need only edit the underlying content at a single location to propagate edits throughout the document. This feature allows for substantially faster revising of complex and/or lengthy documents. Once a madlib data object is created, it may be added to a document In one embodiment, a madlib data object can include a BLANK that may be filled in by a user with content or reference to another data object. For example, a user may create a madlib with a BLANK and may save the madlib to be used later. While editing a document, the user may associate the madlib with the document, and the content of the madlib may be displayed to the user. However, because there is a BLANK in the madlib, the user may be prompted to fill in the BLANK in order to complete the document.

In some embodiments, a madlib may enable content from any type of data object to be used within a document, and a method may be provided to convert or format a specific or arbitrary data object for use as node data object content. For example, a user may wish to reference an object within the document, but which is either not in the context of the document, or is not conveniently located within the context of the document. If the user expects to frequently use said object, rather than typing the entire tag to identify or address the object directly, the user may create a madlib which references the object once, and efficiently reuse the madlib. In some embodiments, any madlib may be quickly referenced as a tag in a document by name, number, or by other identification information associated with the madlib. In this way, a madlib may be used as a type of "pointer" or reference to any data, whether within or without the document processor program and its databases, enabling the user a high degree of flexibility in the drafting of a document and the reuse of existing information.

A list of available madlibs may be document-dependent, provided by an organization, and/or a user may build up their own personal library of madlibs. A user's madlib library may be associated with their user profile or with the documents they have previously authored in the system. Madlibs may be copied or referenced from document to document, and shared with other users. Thus by way of non-limiting example, an attorney using a document processing system for lawyers may share his favorite discovery objections with a junior associate by sharing his collection of discovery response objection madlibs. Likewise, teams may accumulate libraries of madlibs that are preferred for use by that team. These team madlibs may be centrally reviewed by senior attorneys on the team, or even on a firm-wide basis.

Because madlibs may be represented in the database as nodes or data objects, the functions, workflows, and operations of the VCM may operate on them as they would on any other node data object. Thus by way of non-limiting example, a knowledge worker or team of knowledge workers could customize a list of firm-wide discovery objections by creating a "development" or "experimental" branch or fork of the firm's discovery objection mad-libs and using that branch within documents.

As described elsewhere, in some embodiments this may preserve a link between the original or master repository of discovery objection madlibs and the attorney's personal collection. If in the future the original master repository is changed, the individual may be notified via the document processor program client of the change, for example via a notifications or news feed displayed on that user's dashboard; or alternately by email. The user may respond to such communication by pulling those changes into her personal repository or even re-basing her repository on the master, to obtain the benefit of the centrally improved madlibs and yet preserve the substance of her customizations. Alternately, she may communicate the substance of her changes to an integration manager, who may pull some or all of her modifications to the madlibs into the master firm repository.

In this way, many inventive methods for standardization of legal work product for attorneys within a firm is enabled by this system, involving the creation of madlibs in a document processor program, the exchange of those madlibs by attorneys, the re-use of madlibs by attorneys within a firm, the communication of changes in the madlibs to other attorneys, and/or the use of madlibs in conjunction with the workflows and version control techniques described elsewhere.

Moreover, the layout or graphical representation of madlibs presented to a user of a document processor program may also be document dependent. The use of document-type dependent user interfaces may allow for quicker and more efficient document drafting and/or editing. The madlibs may be presented to the user as a list of links; as images; as selectable check boxes and/or other graphical representations.

Figure 22:
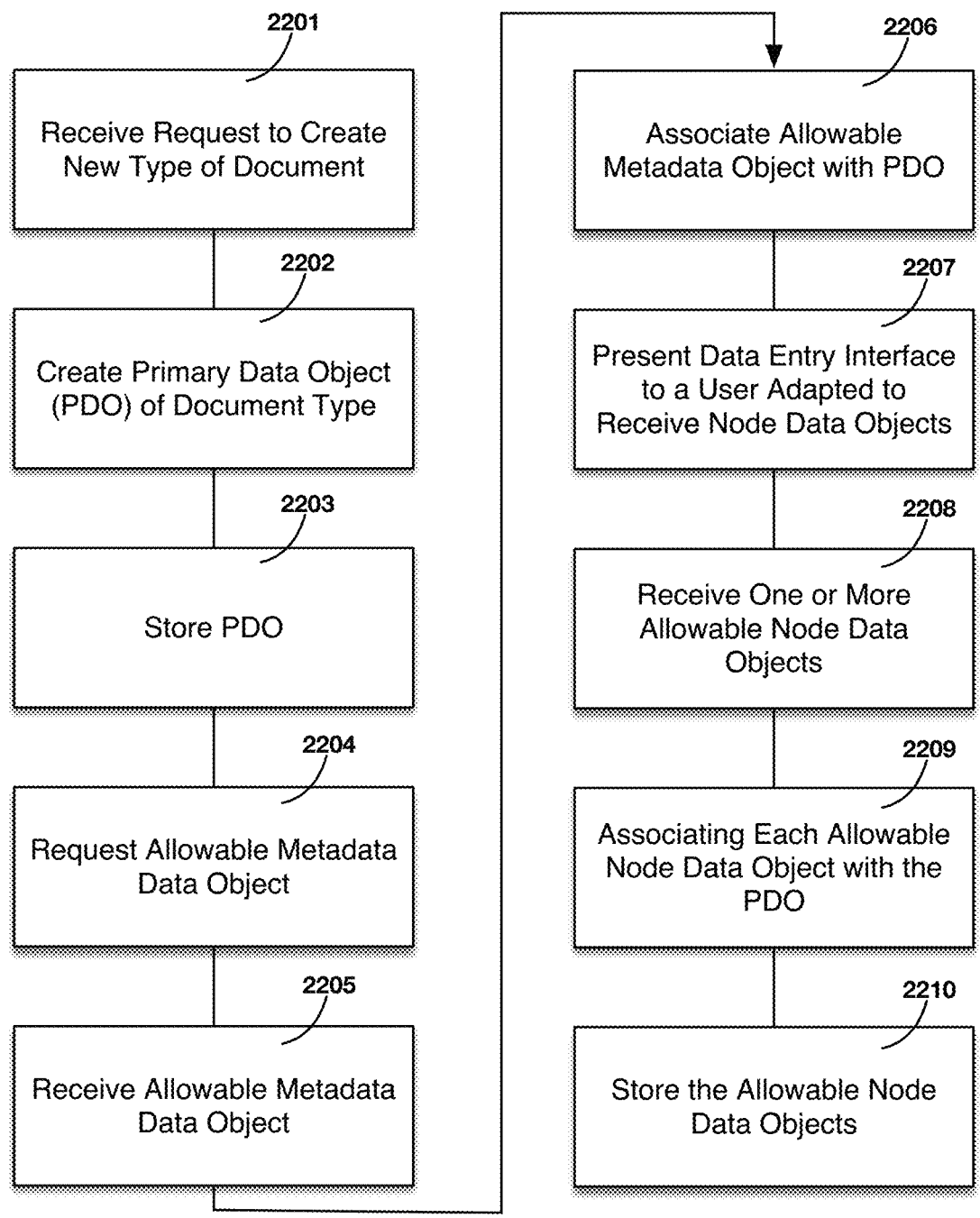
FIG. 22 shows a schematic diagram of a method for creating a document according to an exemplary embodiment.

Referring to FIG. 22, a method of creating a document is illustrated. As shown, the method may begin when a request to create a new document is received from, for example, a user of a client device 2201. Typically, the request will include at least a document type, and may include metadata data objects such as the author and/or date created.

At 2202, in response to the request, the system may create a PDO of the requested document type 2202. As discussed above, the PDO may be associated with a schema which may comprise: (1) allowable node data objects; (2) allowable metadata data objects; and/or allowable data object relationships.

The PDO may be stored 2203. For example, the PDO may be stored in a database of a server.

At 2204, the document processor program may present a metadata entry interface to a user. Such interface may include one or more requests or prompts for allowable metadata data objects. The metadata entry user interface may also include a form or other data entry area for the user to enter the requested metadata data objects.

The user may enter the prompted, allowable metadata, and said metadata may be received by the data processor program 2205. In another embodiment, the system may obtain such metadata from third party systems. In any event, the received metadata may be associated with (i.e., stored or linked to) the PDO 2206 and may be stored on the system.

At 2207, the document processor program may present a different user interface (i.e., a data entry interface) to a user adapted to receive one or more allowable node data objects. As discussed in detail above, the interface may include an indication of allowable node data object types such that the user may add node data objects by selection. The interface may prevent the user from entering a node data object having a type that is not allowable in the particular document type and/or that does not have an allowable relationship to another associated node data object.

The data processing program may receive one or more allowable node data objects from the user device 2208, and each allowable node data object may be associated with (i.e., stored in or linked to) the PDO 2209. The node data objects may also be stored on the system.

Figure 23:
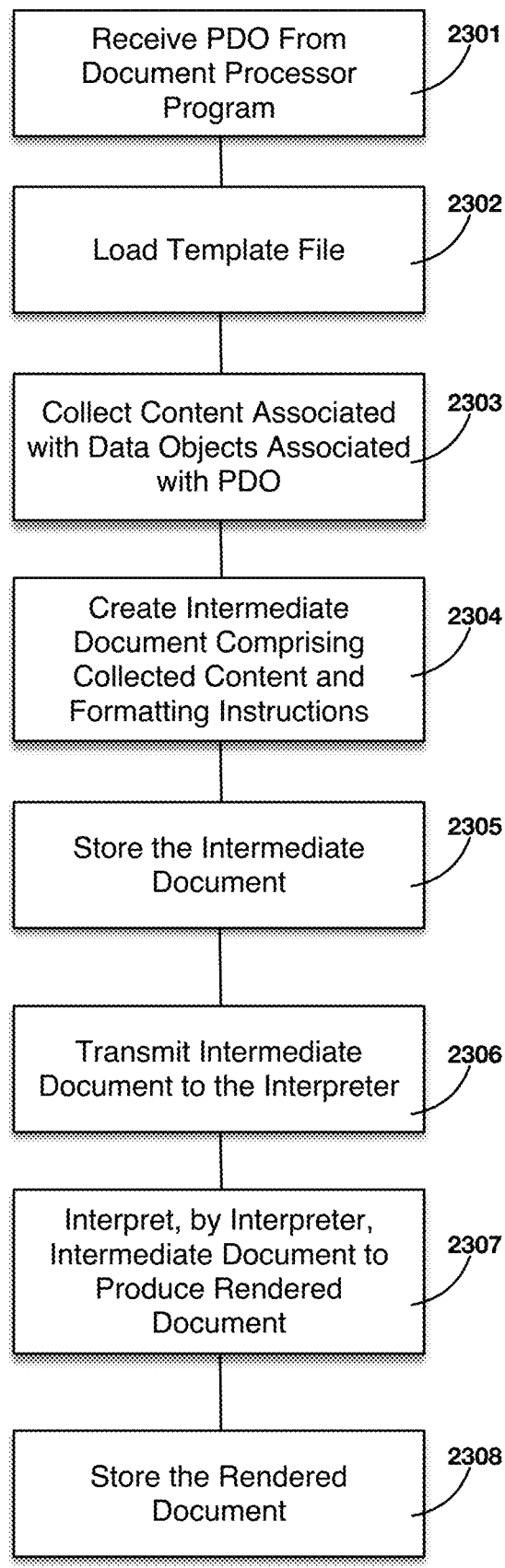
FIG. 23 shows a schematic diagram of a method for creating an intermediate document and rendered document according to an exemplary embodiment.

Referring to FIG. 23, a schematic diagram of an exemplary rendered document creation method is illustrated. At 2301, a document processor program may provide a PDO or link to the same (e.g., URI or the like) to a document compiler. If a link is provided, the document compiler may retrieve the PDO from a database.

At 2302, the document compiler may retrieve the template file from storage. A metadata data object associated with the PDO may inform the document compiler to select a particular template file, such as by including a link to a particular template file stored within the system. In another embodiment, the PDO may be associated with information describing the document type, and the document compiler may select a template file based on that document type.

The document compiler may execute program logic contained therein, or within the template, to create a new file of a particular format ("intermediate document") comprising content stored and/or referenced by each data object (i.e., metadata data objects and/or node data objects) associated with the PDO 2303. The document compiler may need to query various databases or otherwise perform functions as directed by program logic of the template file to create the new file.

Although not particularly limited, the format of the intermediate document may be that of a file type usable with a typesetting system such as TeX or LaTeX; or may be any other markup language. Accordingly, the intermediate document may comprise typesetting, styling, and/or formatting instructions, tags, or the like interspersed with the content from the associated data objects 2304. The intermediate document may be stored on the system, for example in a database 2305.

The intermediate document (or a link to the same) may then be sent to an appropriate interpreter 2306, which may interpret the intermediate document to produce a rendered document having the expected layout, formatting, and/or typesetting 2307. One suitable interpreter for converting an intermediate document having a LaTeX file format to a rendered document having a PDF format is PDFLatex.

At 2308, the rendered document may be stored on the system such that it is accessible by a user of a document management platform. For example, a reference or link to the rendered document may be associated with the PDO, and a user may access the rendered document via a document management platform.

Additionally or alternatively, the rendered document may be transmitted to a user device. As an example, a rendered document may be displayed to a user of a document processor program.

In one embodiment, the intermediate document may be associated with the PDO, such that a user of the document processor program may cause the intermediate document to be rendered "on-demand." For example, a user editing a document with a processor program may desire to "preview" a document as to see recent changes. By selecting a "preview" option, the user causes the linked intermediate document to be sent to the document compiler and the user may then view the resulting rendered document output within the document processor program.

Referring to FIGS. 10-13, screenshots from an exemplary user interface of a document management platform are illustrated. A document management platform may be accessed by a client application, such as but not limited to a web-browser or the like. The client application can communicate with a document management platform running on a server over, for example, a network. Such a configuration may allow a user to access information stored in the document management platform from any location that allows for access to the server and/or to use any computing platform.

In its broadest sense, a document management platform may allow a user to access one or more documents and information relating to such documents stored on the server. To this effect, the document management platform may comprise a user interface having a number of views referred to herein as "dashboards."

Figure 10:
FIG. 10 shows an exemplary user interface of a document management platform.

Referring to FIG. 10, each user of the document management platform may be presented with his own dashboard (i.e., a "personal dashboard"). The user's personal dashboard may include information such as, but not limited to, links to the most recent documents created and/or edited by the user 1001, links to recent matters associated with the user's recent documents 1002, and/or links to clients associated with the user's recent documents and/or matters 1003.

In one embodiment, a user's personal dashboard includes a link that, when selected, navigates the user to the document processor program to begin preparing a document 1004. Alternatively, the personal dashboard may include links to allow the user to create specific document types (e.g., discovery requests 1005 and/or discovery responses 1006). A user may select one of these links to navigate to the document processor program, which may be pre-populated with a document-type specific template.

In one embodiment, whether a link to a document is displayed in the recent document list 1001 may be determined based on a score calculated by the system. For example, each document stored in the system may be assigned a score, and only documents having a score above a certain threshold may be displayed in the recent document list. Alternatively, only a certain number of documents may be displayed in the recent document list, and the list will only comprise the top scoring documents.

A document score may be based on any number of variables, including but not limited to, the number of times a document has been viewed by the user, whether the document was created by the user, the time/date the user last accessed the document, the amount of time the user has spent viewing/editing the document, the number of other users who have viewed/edited the document, the relationship of such other users to the user, a client, matter and/or action associated with the document and combinations thereof.

In certain embodiments, the list of a user's most recent documents may reflect not only the most recent documents created and/or edited by a user, but will also reflect documents that were recently created and/or edited by one or more teammates associated with the user. Accordingly, each user of the document management platform may be associated with one or more other users (i.e., teammates). In order to calculate scores for documents, a score or weight may also be assigned to each teammate. In this way, a teammate who is closely associated with the user can materially influence which documents are linked in the list of the user's most recent documents. This feature may be toggled on/off by a user.

In one embodiment, a list of a user's teammates may be presented on the user's personal dashboard. When a user clicks a link to his teammate's dashboard, the user may view that teammate's dashboard. This means the user may see a teammate's most recent documents, recent matters, recent clients and/or teammates. Additionally, the teammate's biographical information may be included along with a prompt explaining that the user is viewing the teammate's dashboard—not his own.

Figure 11:
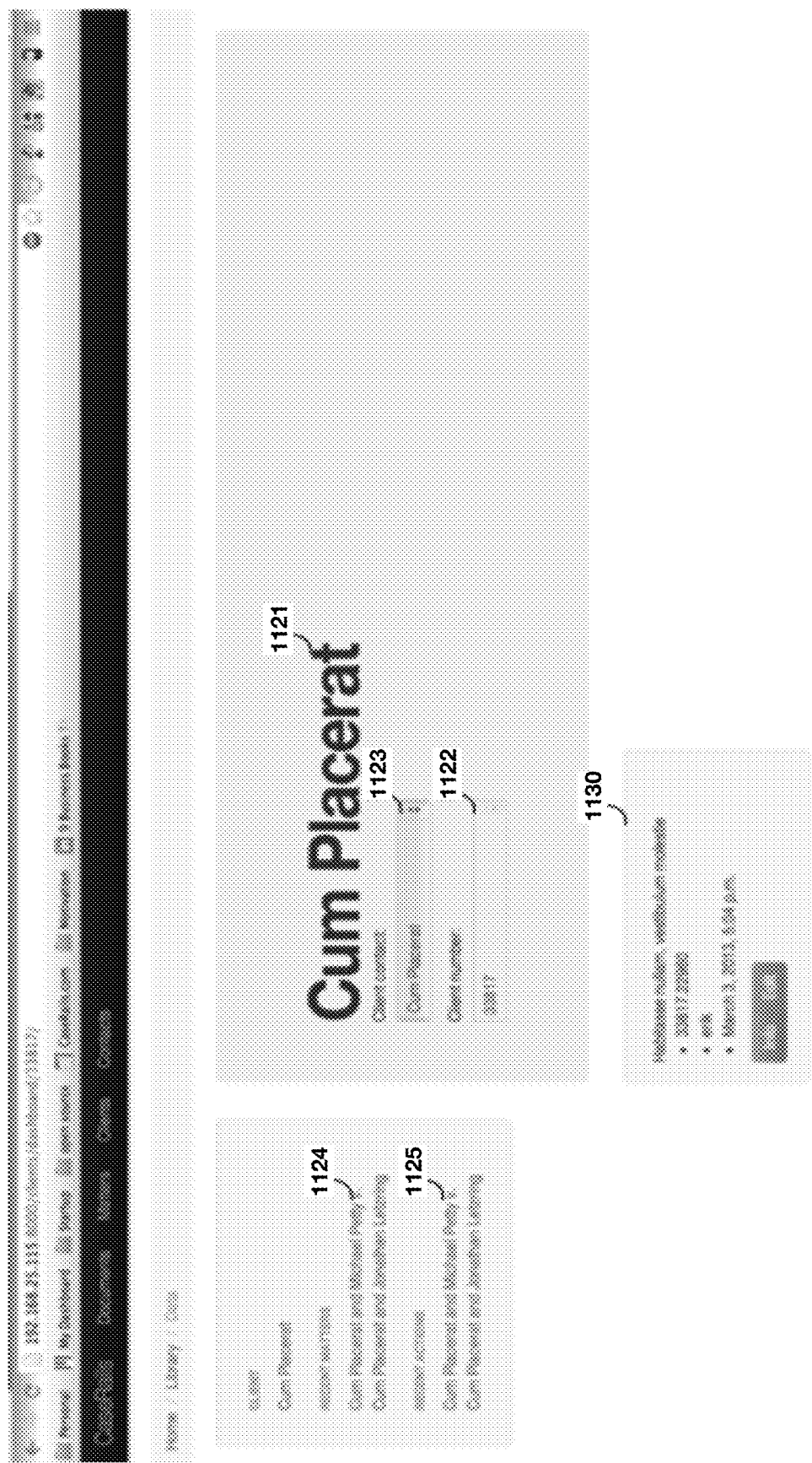
FIG. 11 shows an exemplary user interface of a document management platform.

Referring to FIG. 11, a user who clicks on one of the recent client links may be presented with a client dashboard page. A client dashboard may include such information as the client name 1121, client number 1122, a contact at the client 1123, matters associated with the client 1124, actions associated with the client 1125, and/or documents associated with the client 1130. A list of all documents and/or a list of recent documents associated with the client may also be presented. The recent document list may be populated in much the same way as a user's personal list of recent documents, however each document listed will be associated with the client.

Figure 12:
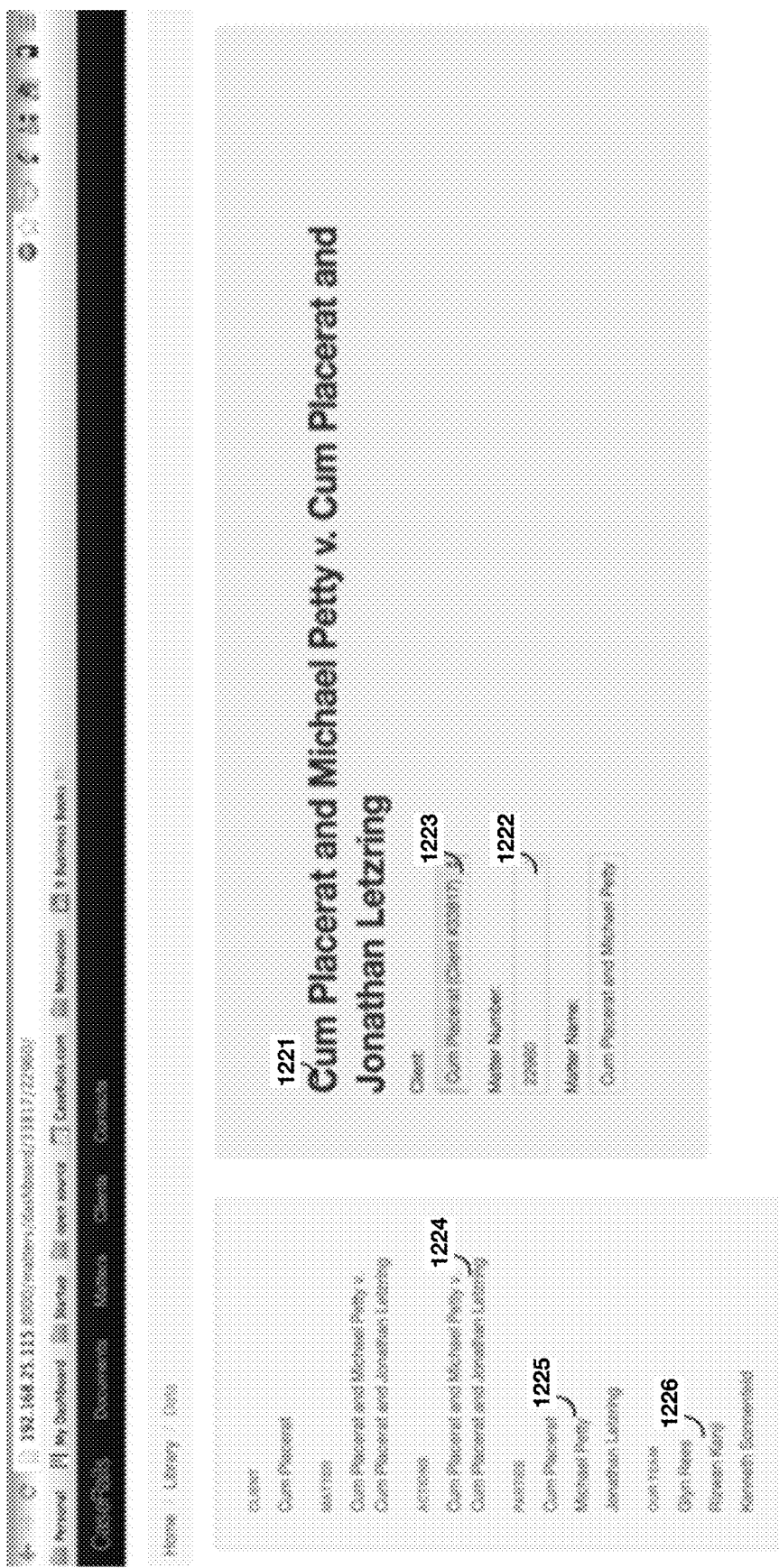
FIG. 12 shows an exemplary user interface of a document management platform.

Referring to FIG. 12, a matter dashboard page is illustrated. As shown, the matter dashboard may include such information as the matter name 1221, matter number 1222, an associated client 1223, any number of associated actions 1224, any number of parties associated with such actions 1225, and counsel associated with such parties 1226. A list of all documents and/or a list of recent documents associated with the matter may also be presented. The recent document list may be populated in much the same way as the user's personal list of recent documents, however each document listed may be associated with the matter.

Figure 13:
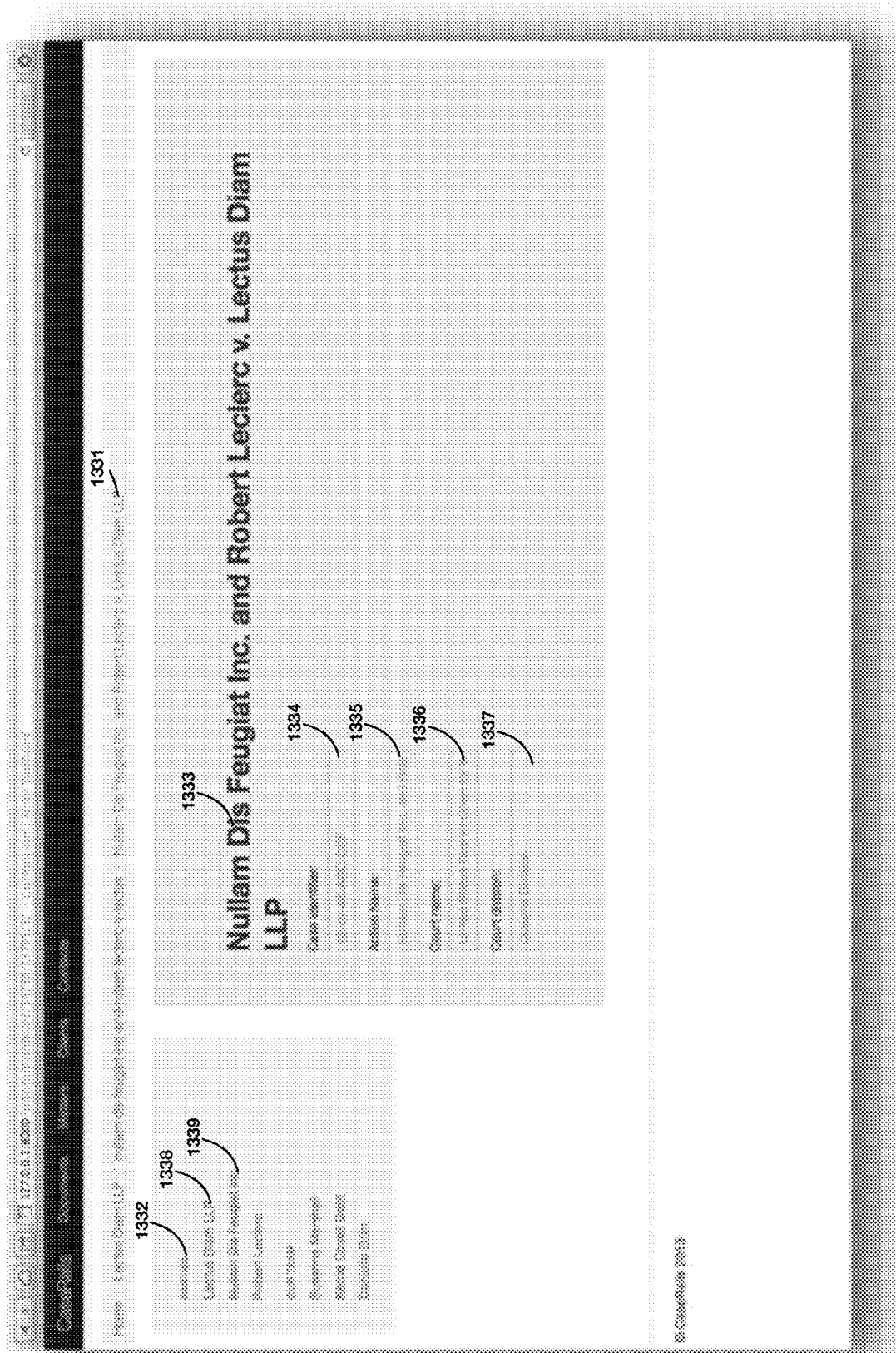
FIG. 13 shows an exemplary user interface of a document management platform.

Referring to FIG. 13 an action or case dashboard page is illustrated. As shown, an action dashboard may include such information as the action name 1333, 1335, action number 1334, associated matter 1331, any number of associated parties 1332, 1338, 1339 and any counsel associated with such parties. A list of all documents and/or a list of recent documents associated with the action may also be presented. The recent document list may be populated in much the same way as a user's personal list of recent documents, however each document listed may be associated with the action.

In general, and action may be a project or sub-project within a matter. Exemplary actions may include, but are not limited to, a case, patent application, contract, deal, or memorandum.

Figure 24:
FIG. 24 shows a screenshot of an exemplary user interface of a document management platform.

Referring to FIG. 24, a screenshot of an exemplary document management platform is illustrated. As shown, the program may comprise a menu 2405 presenting options for a user to view stored documents 2410, matters 2420, cases or actions 2430, and/or contacts 2450. The menu may also comprise a "New Document" button 2401, which, when selected, may present a document processor program to the user such that the user may create a new document from scratch.

In the illustrated embodiment, a user has selected the documents button/link 2410 and is viewing a list of documents 2411. As shown, the document list may comprises all documents created by the user, a group of users, or all of the users within a firm or organization. Any group or sub-group of documents may be presented by filtering the document list (e.g., all documents authored or edited by a user or group of users and/or all documents recently viewed, created or edited by a user or group of users). The list of documents 2411 may comprise a title, author, matter, client, document type, date of creation, and/or date of last modification. A user may open any of the documents in the document processor by, for example, clicking on the title of the document.

A document management platform may comprise a control panel 2460 having any number of options relating to the current page and/or data objects existing on the current page. As shown, when no documents are selected, the only selectable options presented in the control panel are search 2462 and "New Document" 2461, which, when clicked, may present a document processor program to the user such that the user may create a new document.

Figure 25:
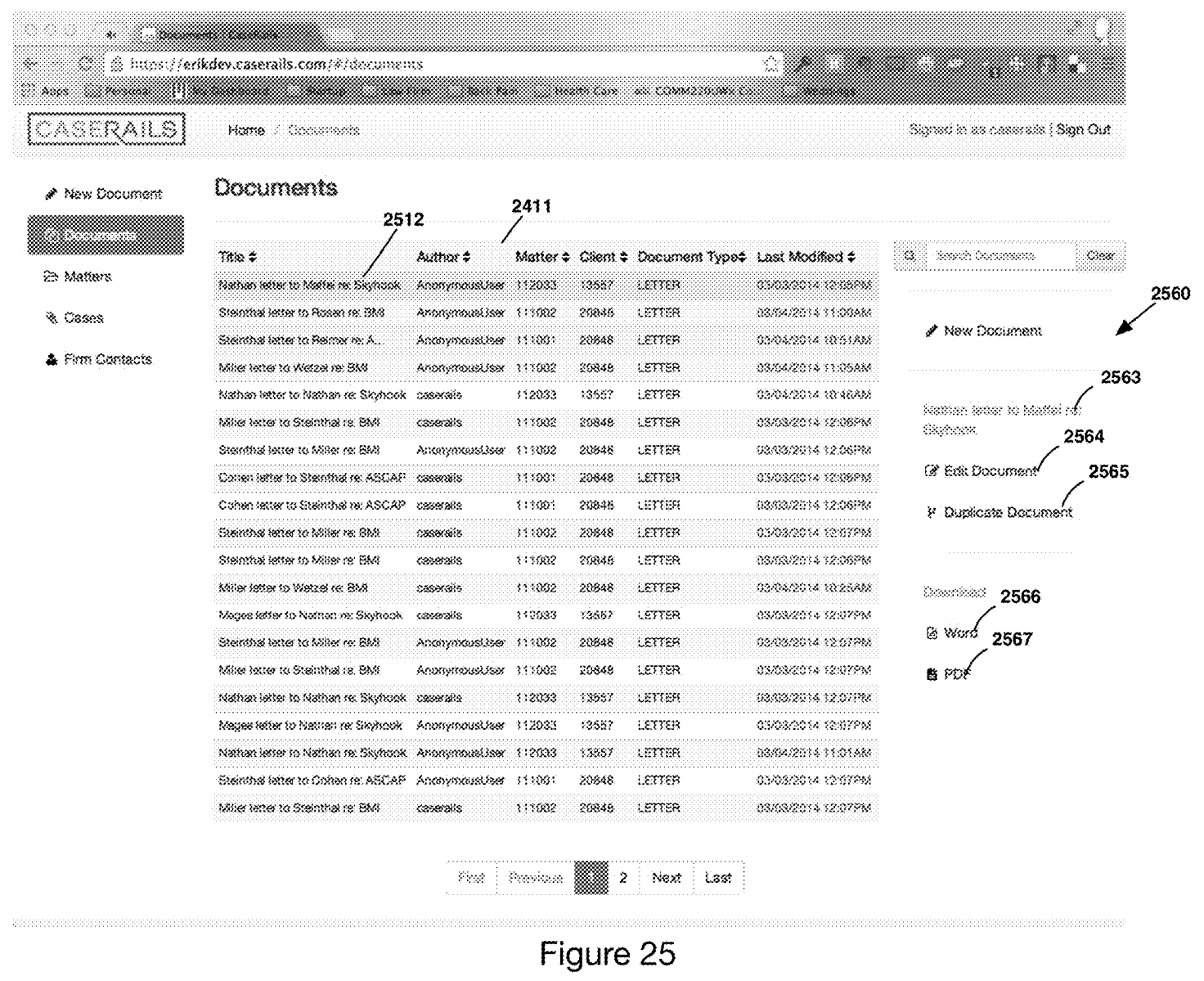

Referring to FIG. 25, a screenshot of an exemplary document management platform is illustrated, wherein the user has navigated to an exemplary document list 2411. As shown, a user has selected a document 2512. The control panel 2560 indicates that the document is selected by displaying the document Title 2563. Moreover, additional options are now available to the user, such as but not limited to editing the document 2564, duplicating the document 2465 or downloading the document as a MICROSOFT WORD™ document 2566 or PDF 2567.

In certain embodiments, the program keeps track of a user's position within the program. For example, the program may determine the data object that the user has navigated to, and may further determine if the user selects a specific item in that data object. In the screen shot of FIG. 25, the user has not navigated into a client, matter, action/case, or contact data object, so the only contextual option shown to the user can occur when the user selects a document 2512. The contextual options to edit the selected document 2564, duplicate the document 2565, or download the selected document 2566, 2567 appear in the control panel 2560. This concept is explained in greater detail in relation to a matter (FIGS. 26-28) and a case/action (FIGS. 28-31)

Figure 26:
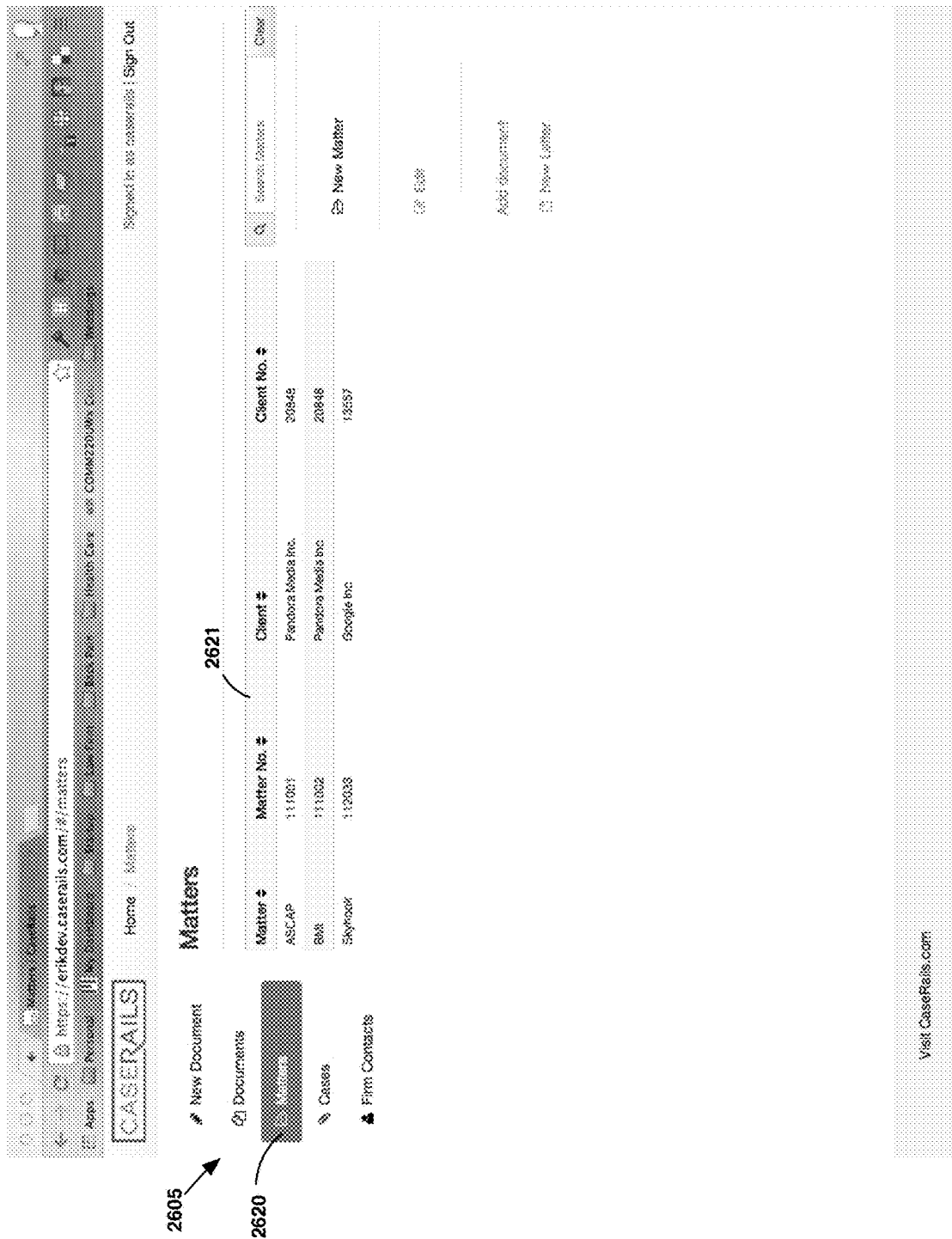
FIG. 26 shows a screenshot of an exemplary user interface of a document management platform.

Referring to FIG. 26, a screenshot of an exemplary document management platform is shown, wherein a user has navigated to a matter list page or interface. As shown, the user may select a matter button 2620 in a menu 2605 to view a list of matters 2621. A matter list may comprise all matters (i.e., projects) created by the user's firm or organization. It will be appreciated that a list of a user's matters may also be presented (e.g., all matters created by a user, or all matters where a user has authored, viewed, and/or edited a data object associated with the matter). The matter list 2621 may comprise matter names, matter numbers, client names, and/or client numbers. A user may open any of the matters by, for example, clicking on the matter name.

Figure 27:
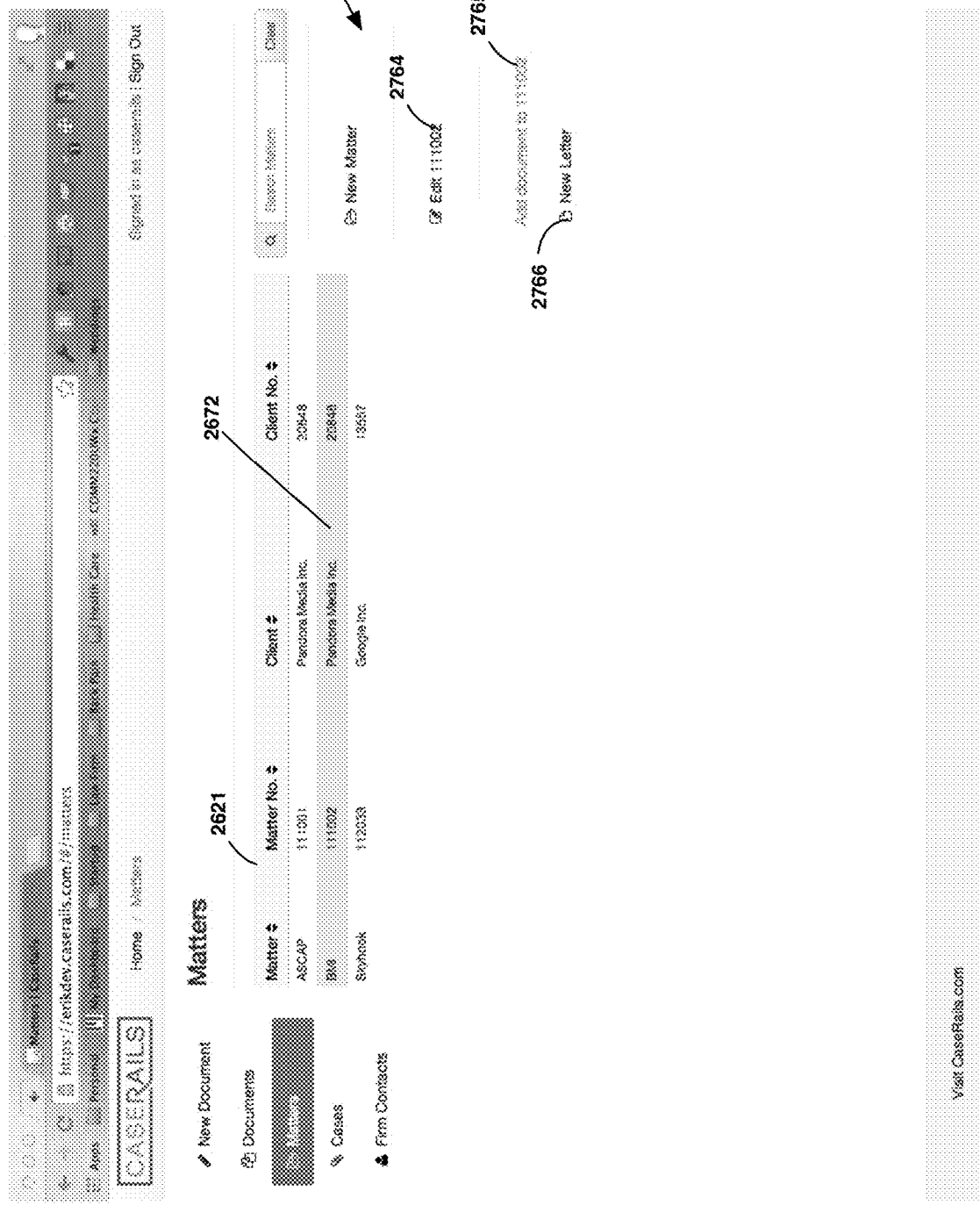
FIG. 27 shows a screenshot of an exemplary user interface of a document management platform.

Referring to FIG. 27, a screenshot of an exemplary document management platform is shown, wherein the user has navigated to an exemplary matter list 2621 and has further selected a matter 2672. As shown, a control panel 2760 indicates that the matter is selected by displaying the matter name 2765.

In one embodiment, the control panel 2760 may present contextual options to a user based on a user's position within the system and/or a data object selected by the user. In the illustrated embodiment, the selection of a matter 2672 gives the system additional context, and the control panel may display the option to edit the selected matter 2764 along with the matter name or number 2765.

Moreover, the system may use the newly entered context (i.e., matter name, matter number, the client associated with the matter, the client number associated with the selected matter) to display contextual document drafting and editing options to the user. For example, the system presents the user with a New Letter button 2766.

Figure 28:
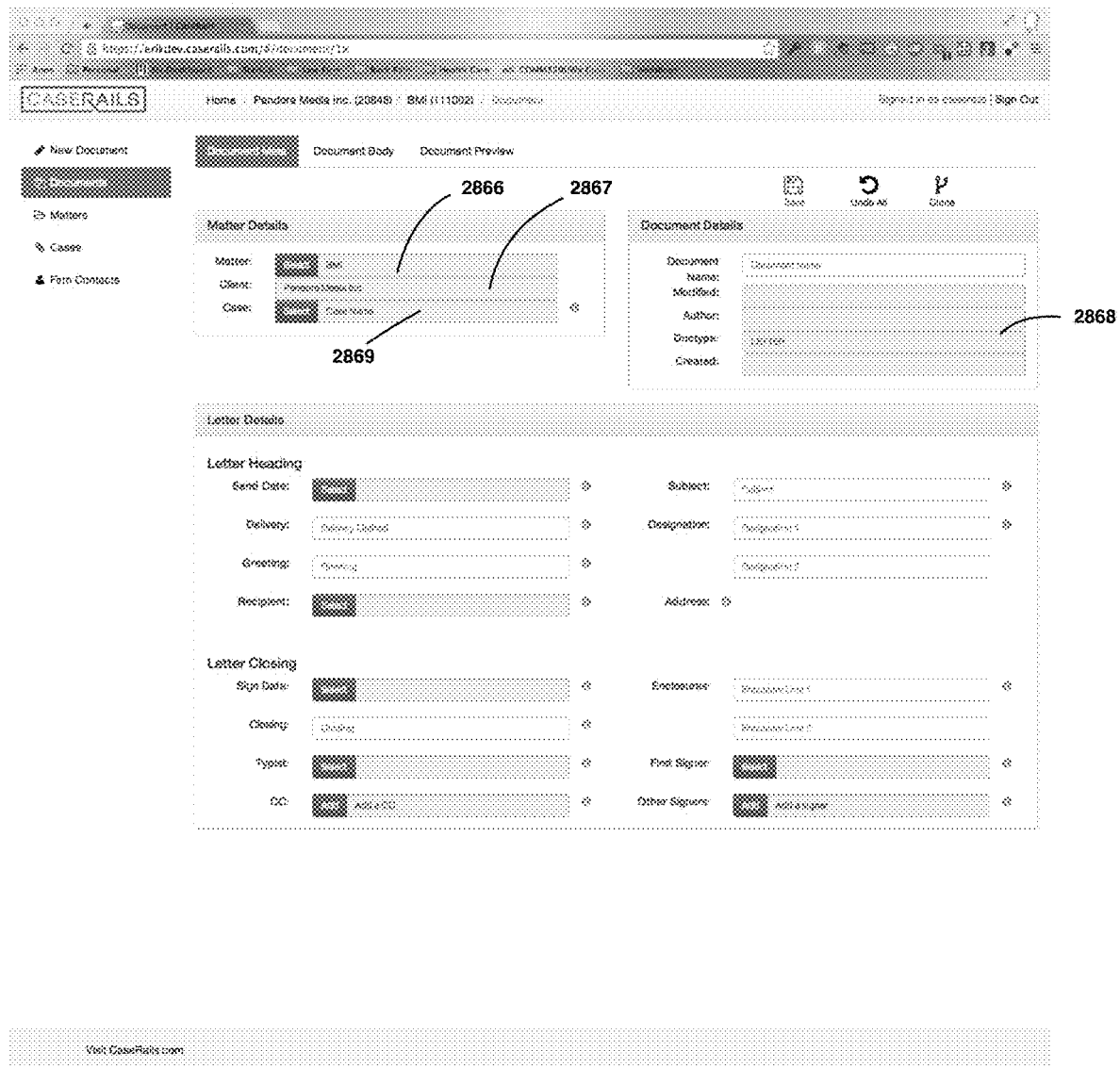
FIG. 28 shows a screenshot of an exemplary user interface of a document management platform.

FIG. 28 shows a screen shot of a document detail (metadata entry) page, which the user is navigated to as a result of selecting the "New Letter" button 2766 in FIG. 27. As shown, the new letter document may be automatically populated with contextual data, such as but not limited to, the selected matter information 2866 (same as FIG. 27 at 2764), the client associated with the matter 2867, and the type of document 2868 (i.e., letter). In this way, the system allows a user to quickly and efficiently start drafting a document from nearly any place in the system, and further speeds up the process by automatically filing in the contextual information relating to the user's place in the system and/or a selected data object. It will be noted that the system does not fill out the case information 2869 because it does not "know" that information based solely on the user selecting the matter.

Figure 29:
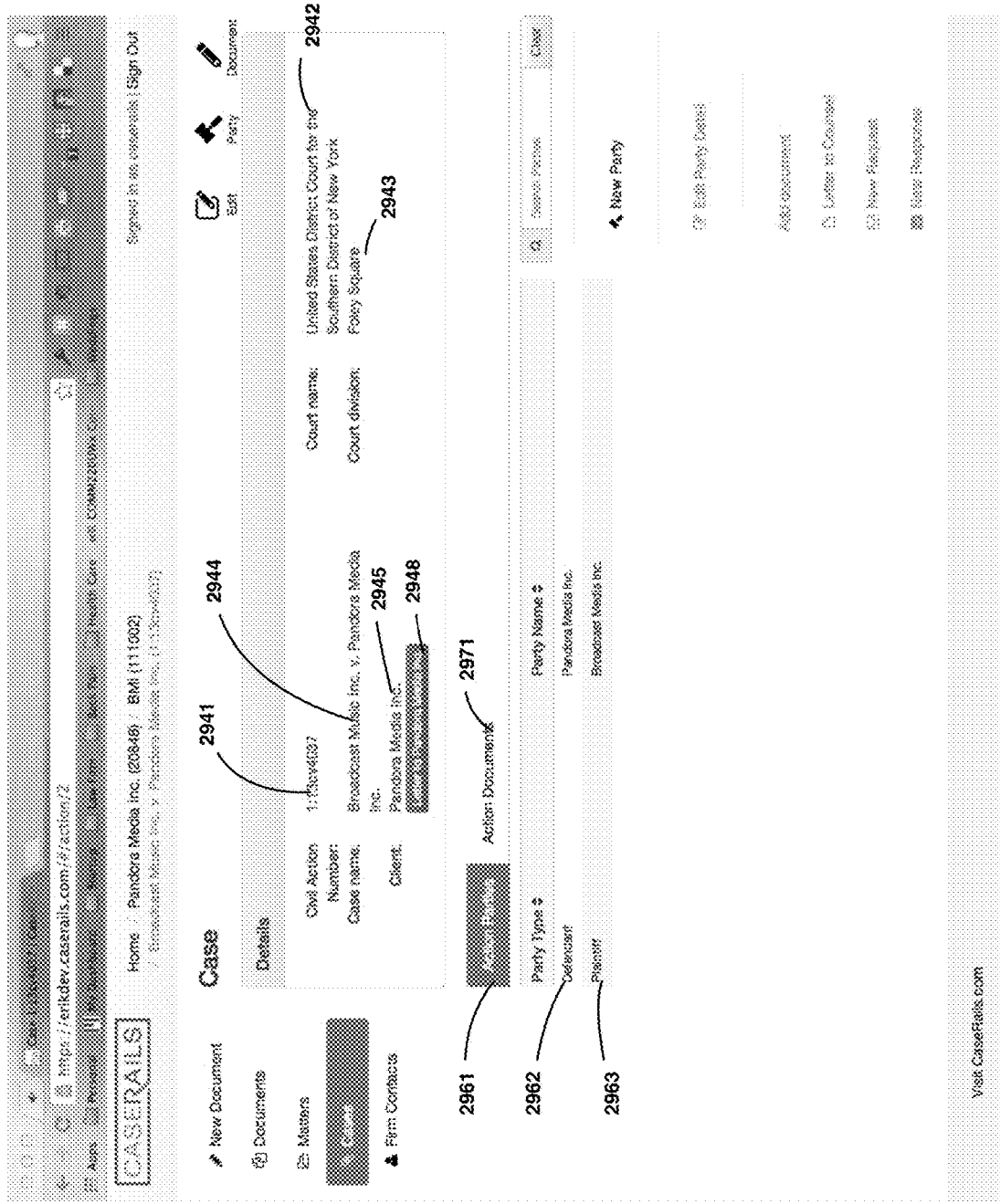
FIG. 29 shows a screenshot of an exemplary user interface of a document management platform.

Referring to FIG. 29 another screenshot of an exemplary document management platform user interface is shown, wherein the user has navigated to a specific case dashboard. As shown, a case dashboard may present information about a case to the user, such as but not limited to case name 2944, case civil action number 2941, the name of the client associated with the matter 2945, client number (not shown), court name 2942, court division 2943, etc. The case dashboard may also present a list of documents associated with the case 2971 and/or a list parties 2961 associated with the case.

As discussed above, an exemplary system may use contextual data, such as the user's position within the case, to present contextual options to the user. In the illustrated embodiment, the system "knows" the client 2945 associated with the case, and may present the user with a contextual option 2948 to draft a letter to the client relating to the case. When a user selects this option, he may be navigated to a new letter document page with metadata such as but not limited to client name, client number, matter name, matter number, case name, case number, court name, court division, recipient, recipient address and subject of the letter, automatically filled-in for the user.

In one embodiment, the system may automatically populate parties associated with a case (e.g., Defendant 2962 and Plaintiff 2963) or a user may manually create the same. Parties may comprise one or more contacts and contact designations (e.g., main contact, partner, associate, etc.).

Figure 30:
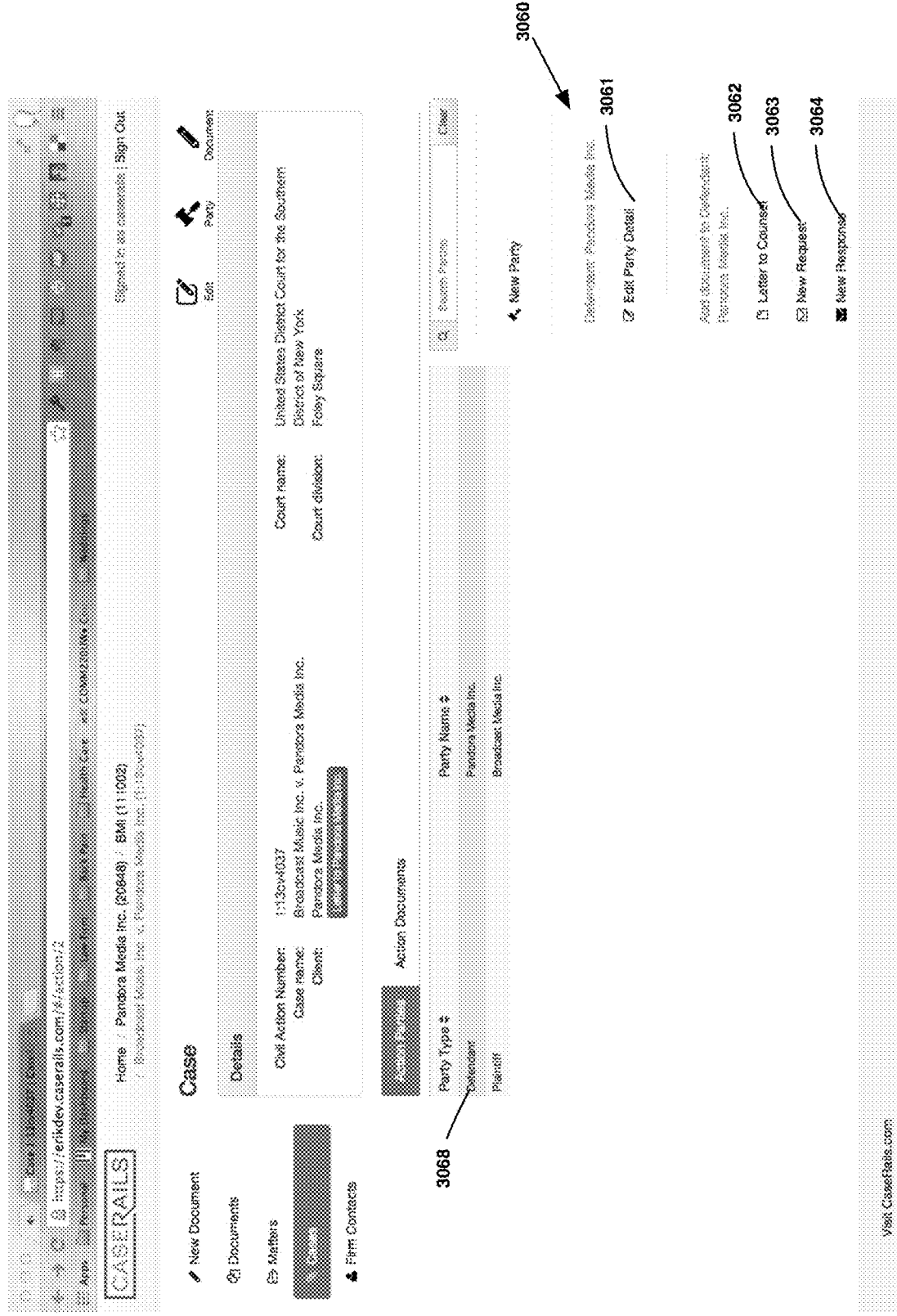
FIG. 30 shows a screenshot of an exemplary user interface of a document management platform.

Referring to FIG. 30, when a party 3068 is selected by the user, the user may be presented contextual document drafting options in, for example, a contextual menu 3060. In certain embodiments, the user may edit the details of a party 3061 (e.g., add or remove contacts), draft a new letter to the members of the party regarding the case 3062, prepare a new request in the case to the party 3063, and/or draft a new response in the case to the selected party 3064.

Figure 31:
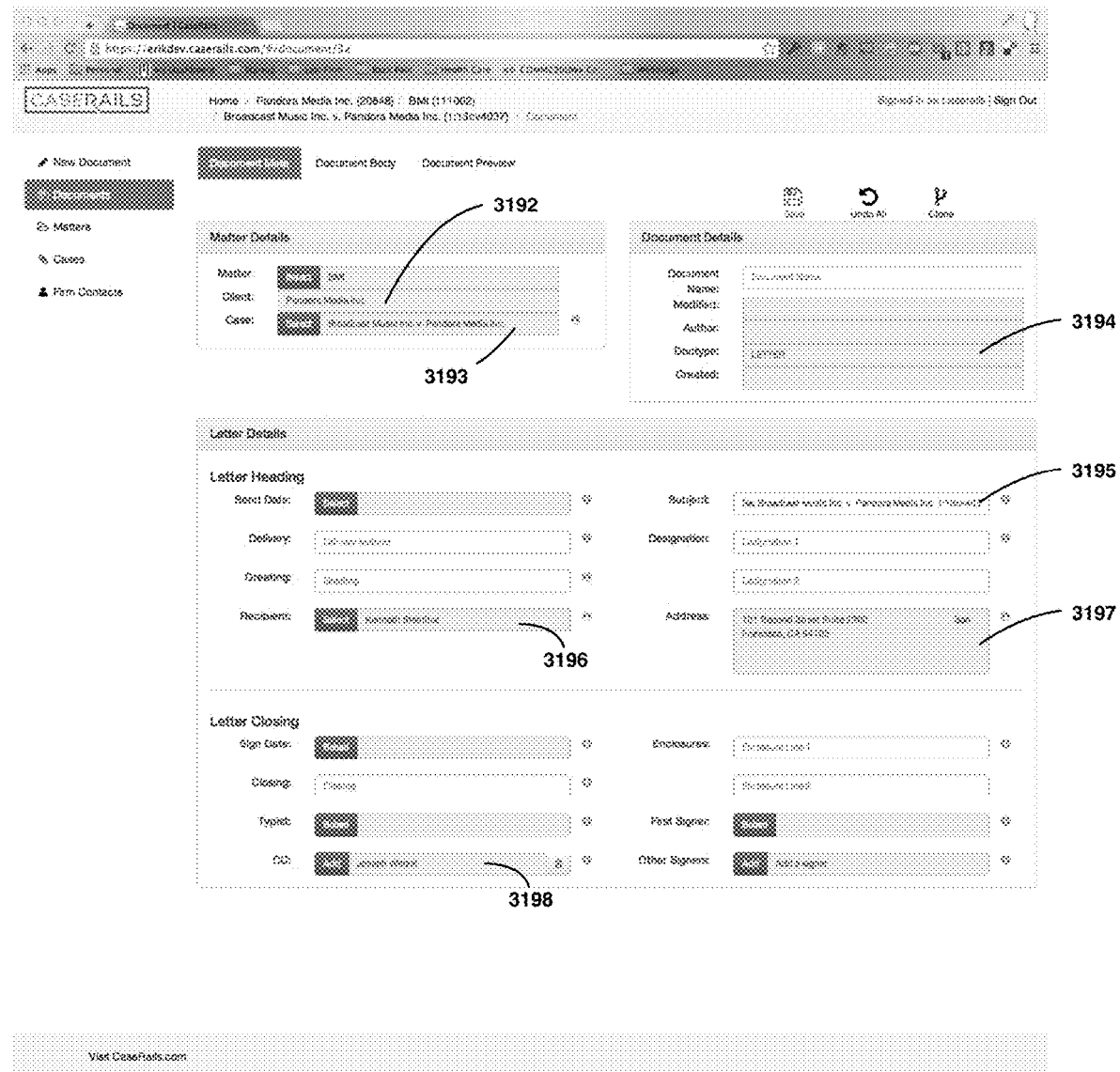
FIG. 31 shows a screenshot of an exemplary user interface of a document management platform.

FIG. 31 shows a screenshot of an exemplary document management platform, where the user clicked the Letter to Counsel 3162 link in FIG. 30. As shown, the user may be navigated to a new document metadata entry page, where metadata entry fields may be automatically populated by the system based on the contextual information determined at the time of clicking the Letter to Counsel link in FIG. 30. For example, metadata information such as but not limited to client name 3192, client number, matter name, matter number, case name 3193, case number, court name, court division, main party recipient 3196, main party recipient address 3197, carbon copied party contacts 3198, document type 3194 and subject of the letter 3195, may be automatically filled for the user. In this way a user can quickly and accurately draft a document in a case directly from the case dashboard.

The document management platform may also store any number of contacts, and such contacts may be accessible from a user's personal dashboard by clicking on the contact link. A contact data object may store or link to identification information such as but not limited to: a contact first and last name, addresses, phone numbers, notes, email addresses, birthday, website, job title, nickname, and/or picture. Additionally, each contact may be associated with another data object such as a party, counsel, client, user, sender, recipient, etc. The client application may allow the user to create and/or manipulate contact data objects via various user interfaces, and communicate the same to the server.

As described elsewhere, a primary strength of the inventive document processor program and document management platform is that, through the use of user-friendly interfaces and flexible data objects such as relationships and madlibs, the copying and/or re-entry of data may be minimized in favor of reusing existing data in the same or other systems through references. Alternately, data may be copied into its new location to prevent loss in case of a change to the original object, but a reference to the source retained. An additional benefit to such source references is that when a change is made to a data object within or without the system, that change can propagate automatically to all documents in the system. In some embodiments, the change is not automatically applied, but a user is notified that the change has occurred and is provided the opportunity to decide whether to accept or reject the change. By way of non-limiting example, if the mailing address on a contact object were to change, each of the documents and other data objects which reference said contact object could be automatically updated to use the new address, or a user could be provided a list of the locations in his documents where the contact object is referenced and provided an opportunity to apply the change.

Figure 14:
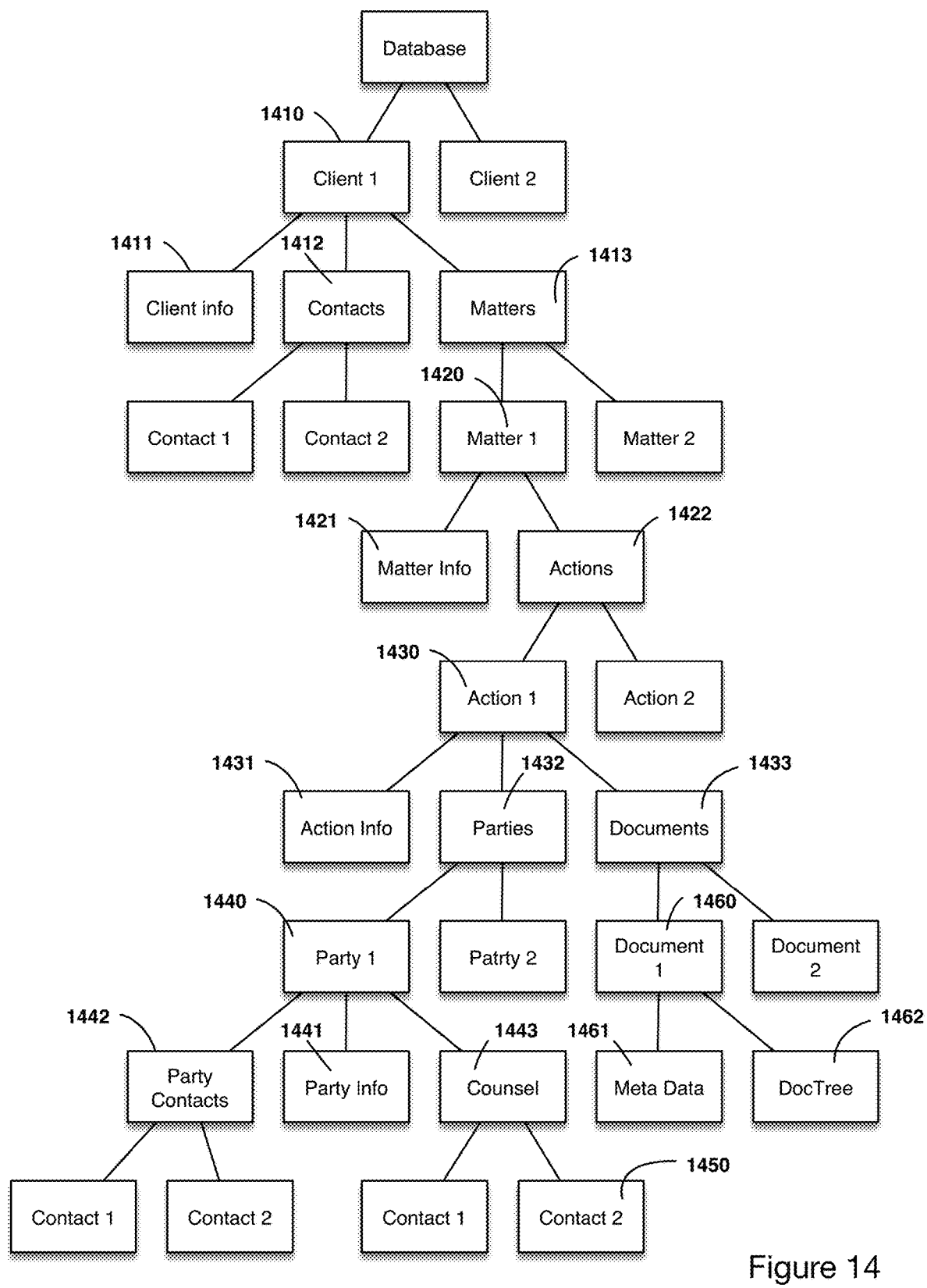
FIG. 14 shows a schematic diagram of related data objects employed in an exemplary document management platform.

Referring to FIG. 14, a schematic diagram of related data objects employed in an exemplary document management platform is illustrated. As shown, a client data object 1410 may be associated with client information 1411, client contacts 1412, and matters 1413. A matter 1420 may be associated with matter information 1421 and one or more actions 1422. An action 1430 may be associated with action information 1431, parties 1432, and documents 1433. A party 1440 may be associated with party information 1441, one or more contact data objects 1442, and one or more counsel data objects 1443, which are in turn associated with contact data objects 1450. Finally, a document 1460 may be associated with metadata 1461 and any number of related node and/or madlib data objects that form the doctree 1462.

Figure 15:
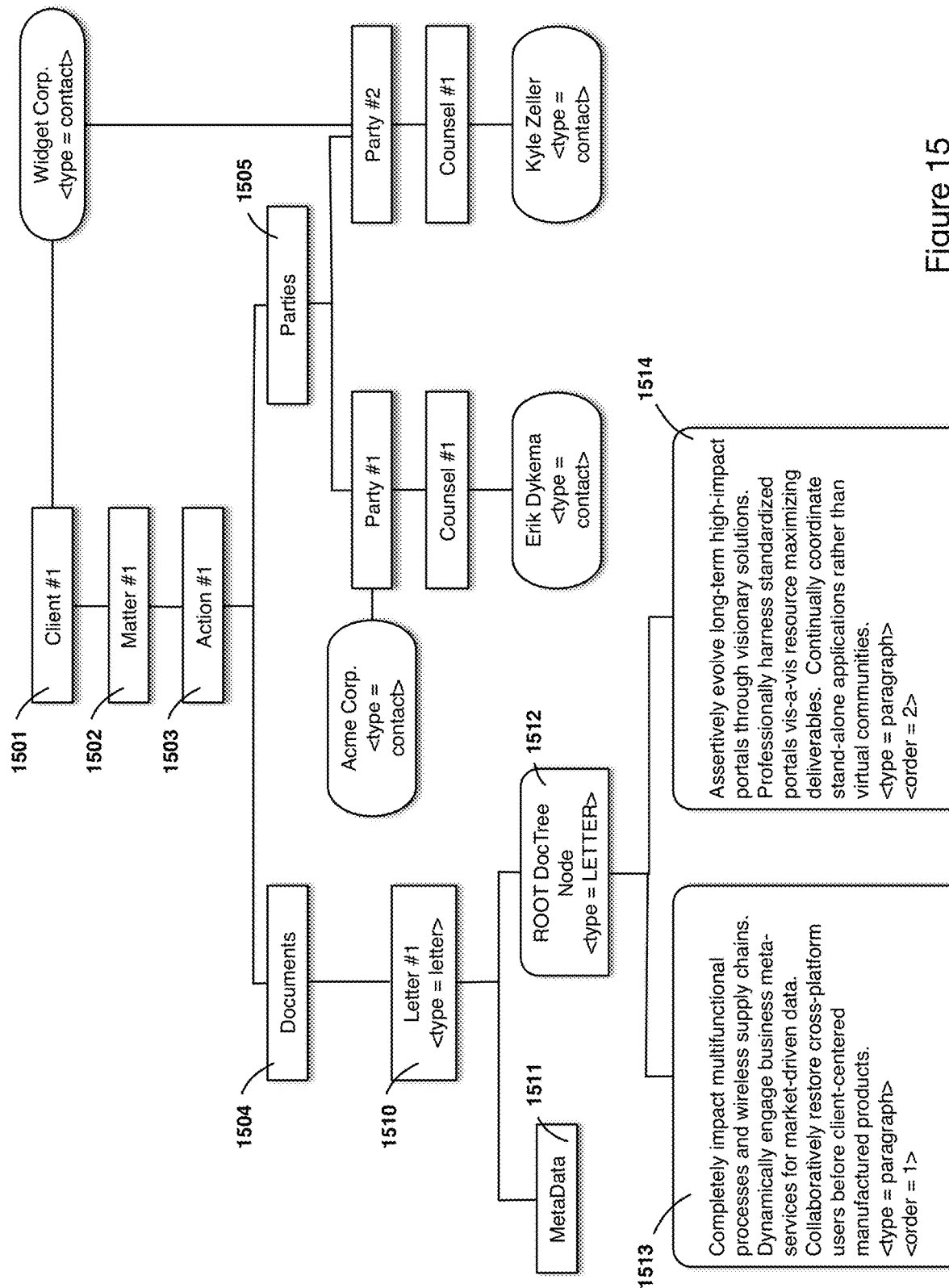
FIG. 15 shows a schematic diagram of a representative data structure of a letter document.

Referring to FIG. 15, a representative data structure of an exemplary letter is illustrated. As shown, numerous data objects may make up a single "document." A document processor program may be adapted to associate any number of data objects with a particular document. Moreover, a document processor program may access such data objects to edit and/or retrieve content associated therewith in order to provide a high level of context to a user drafting a document.

In this embodiment, the document processor program associates the following types of data objects with a letter type document: a client data objects representing clients of a law firm 1501; matter data objects representing matters that the law firm is currently handling (or has handled in the past) for each client 1502; and action data objects representing specific cases in courts or other tribunals where the firm represents (or has represented) a client 1503. An action data object is shown to be associated with matter data objects, and may also be associated with documents 1504 and/or party data objects 1505.

Each data object may contain or reference its own specific and appropriate information. For example, a client data object may comprise a name of a client and/or a client number, and may be associated with a contact data object. An action data object may comprise a court name, court division, local rules, case ID number, or other fields. Likewise, a letter data object 1510 may comprise model specific information such as a typist, recipients, senders, signers, and so on. Such information may be referred to as metadata 1511.

It should be noted that metadata in this context does not necessarily refer not to a specific table structure, field, or foreign key relationship, but rather to the relationship between the elements of one or more data objects. Thus, if a letter has multiple recipients, the recipients could be said to be within the metadata of the letter, regardless of whether the letter object links to the contacts objects directly, or whether there is a RECIPIENT object which links to both the letter object and the contact object, or via some other method of associating between several objects or data elements.

Further, a document, such as but not limited to a letter, may be associated with or represented by PDO, which may be the root of that document's tree of data objects, or Doctree 1510. As depicted, the PDO references both metadata 1511 as well as the root of a tree of nodes 1512, also known as a DocTree, which contain the body content of the document. The DocTree depicted in this example has three nodes—a ROOT node and two child nodes 1513, 1514 representing paragraphs. In one embodiment, the root node may have a node type identical to the type of the document with which it is related, in this case, LETTER. The children of the root node, in this case, are two nodes with type PARAGRAPH. Each of the nodes may comprise a content field, a node type field, an order field, a label field, and a miscellaneous field. In some embodiments, the content field of a node with children may be empty, and a method is used to combine the content fields of the children to provide content for the parent node. The order field specifies which order to list or place this node in relation to its peers when each of a document's nodes are aggregated (e.g., when a document is presented to a user in the document processor program and/or when the document is compiled by a document compiler to produce a rendered document.) The content field may contain the actual content which the node is intended to store. The label field may contain a textual label, which in some circumstances may be rendered by the document compiler into the finished document. The miscellaneous field may a dictionary of other data related to the node.

In one embodiment, the user may enter "tags" into a document. A tag may comprise a placeholder where the document processor program may later insert other data objects. For example, the user could type into the body of the document, "I really enjoyed the conference room coffee at <RECIPIENT.FIRM>." Later, when the document processing system encounters this tag, it may replace the tag in the output with the data referenced by the tag. Thus the result, when printed, would be "I really enjoyed the conference room coffee at Bunk, McNulty & Little LLP" in accordance with the name of the recipient's law firm. Tags can retrieve and insert data into the body or metadata locations of documents, as long as that data is addressable. Content may be addressable via a contextual relation to the document, or addressable according to the same principles as an ORM. In other words, the document may, through tags, pull in data from its context or from anywhere in the database. The context of the document includes any data objects modeled in the document processing system which have a direct or indirect relation to the document, as well as certain other types of data retrievable from third party systems. As described elsewhere, the context may include any data that is accessible via the ORM. The context may also include data that is accessible or presented by the version control management system.

Furthermore, in some embodiments, even information not precisely addressable may be employed in the document by way of query tags. A query tag, like other tags described herein, is used to reference data within a document. However, a query tag is used rather than a standard tag where the information may not be precisely addressable, or may be more easily addressed with a query, or where more than one data element may be desired.

By way of non-limiting example, a data object modeling a patent may have multiple CLAIM members. If the claim number of the first dependent claim is not known, it may nonetheless be included with query tag which indicates the group of objects desired and an index to identify one or more individual objects within the group, such as <ACTION.PATENT_AT_ISSUE.DEPENDENT_CLAIMS.0>.

In some embodiments, tags may also be used to embed presentation logic within the document body itself. Continuing the previous example, if a query tag returns multiple elements, a series of tags and content could be used to include each of them. For example, the following tag may embed a list of the numbers of independent claims from a patent into a document: <FOR CLAIM IN PATENT.INDEPENDENT_CLAIMS> <CLAIM.NUMBER> <END-FOR>.

As discussed above with respect to tags, any of the information depicted in FIG. 15 is in the context of the document and may be employed in a document by way of tags. Thus, for example, if the user includes a tag such as <PARTIES.PLAINTIFF.NAME> that text would be replaced with the name of the plaintiff (i.e., Acme Corp); or alternately if the user included the tag <ACTION.MATTER.CLIENT.NAME> that text would be replaced with the name of the client (i.e., Widget Corp).

Figure 16:
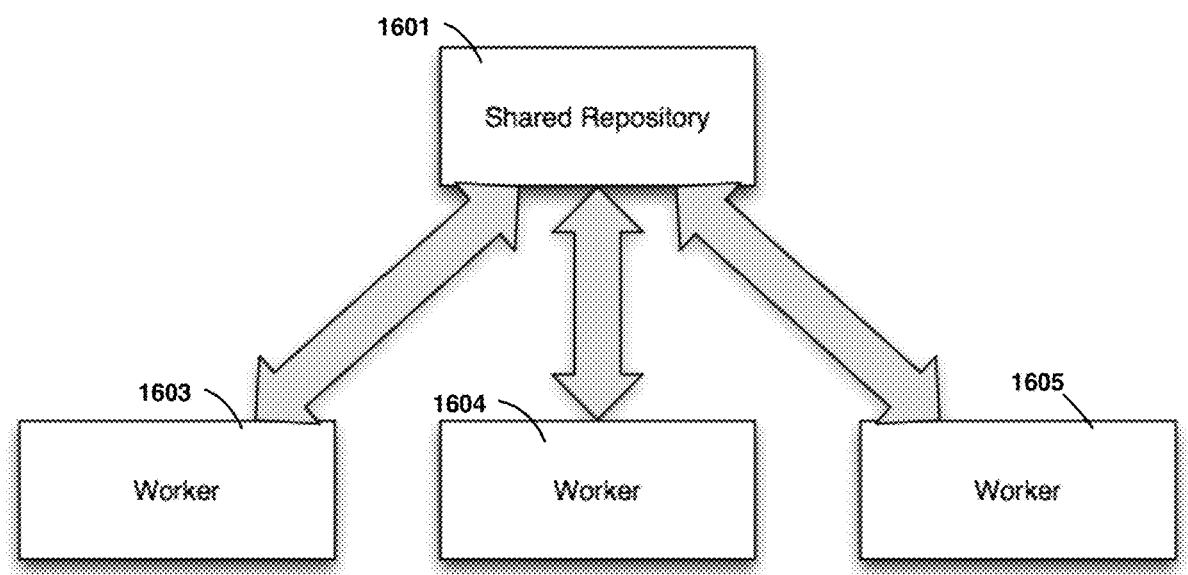
FIG. 16 shows a schematic diagram of an exemplary version control system.

Referring to FIG. 16, in one embodiment, the document processing system may incorporate version control functionality. Version control is useful both for professionals creating and editing documents on their own, as well as for professionals writing documents as part of a collaborative effort (in a single team or multiple teams).

The inventive document processor program and/or document management platform includes and/or is compatible with several types of version control systems. Prior to the present invention, version control functionality has been limited to two types of systems—"redline" type version control and "file" type version control. Each of these systems provides some useful features, but also presents difficulties and may be insufficient to enable the optimum document drafting work flows. Further, combining either or both types of these version control systems with ordinary stream formatted documents does not solve all of the problems or correct for each of the deficiencies inherent in any one system and in fact compounds the problems of each system and for this reason is undesirable.

Redline-type version control typically provides for tracking changes within a document by storing, within the document file itself, or within the document stream in the case of markup language document file formats, or by reference to different entire versions of the same file, the changed text. The changed text may be identified by the name of the user making the change and/or the time of the change, if this is known, as well as with a comment relating to the change.

Problems with redline-type version control may include losing history when tracked changes are accepted, an inability to automatically merge changes, an inability to dynamically generate a report detailing the differences between two arbitrary versions, and the risk that if a file is corrupted, both prior versions of the document and the current version of the document may be lost. Additionally, sometimes the user is not known or the user may forget to activate track changes. Lastly, even in the situation where the user has activated track changes, the user may "accept" tracked changes—deleting the record of the document's history—in an effort to simplify the user interface (e.g. removing redlines from a screen) or to correct errors which are frequently introduced into the document by the methods used to store change history in the document itself.

File-type version control is typified by a document management system such as KnowledgeTree™ by KnowledgeTree, Inc. or WorkSite™ by Autonomy iManage. File level version control typically involves "checking out" a version of a file by the user, editing the file to create a new version, and "checking in" the new version of the file. Old versions of the file may be stored permanently, or discarded as new versions are created.

Problems with known file-type version control systems include the inability to track sub-file level changes (e.g. distinguishing between a change to a file and a completely new file, or changes to two different sections of a document), the inability to merge changes from two files into one file, the inability of a user to check out a document if another user has already checked out the document, the ability for a user to "lock" a document, causing other users to be unable to access the document, the inability of a user to work on just a portion of the document without checking out the entire document, the necessity of identifying and managing files on the user's machine, and the inability to generate reports of intra-file changes without checking out each file.

Although some portions and embodiments of the instant invention can be used with existing document version control systems, such systems may not provide all of the features necessary to provide optimal workflows for professional document processing. For example, existing systems do not provide multi-user offline editing with automatic merging of changes, or concurrent multi-user online editing.

In one embodiment, a version control module ("VCM") may be employed as a software layer that interfaces between any number of objects stored in a database and a modern and/or distributed source code revision control systems or source code management systems (version control system or "VCS"). Such VCS systems may include, for example, Git, Mercurial, Subversion and/or the like.

The VCM may perform several functions. First, the VCM may create a usable abstraction of one or more VCS's in a programming language, e.g. an API, which the document system may use to interface with the low level functions of a VCS, including those functions that may be unique to the VCS. An API may be provided in, for example, the native language in which the document system was developed, allowing a tighter integration between the two systems. If the VCM does not provide an API, the software system may need to directly call command line functions, or interface with non-native libraries, or use socket based, IP based, or some other form of inter-process communication to interface with the VCS.

By way of non-limiting example, a VCM for a document processor program written in the Python programming language may provide a native Python low-level API to a Git VCS. This API may expose each of the particular capabilities and items provided by the Git system, such as indexes, trees, blobs, and/or other Git specific objects and methods. Examples of Git-specific low level objects and methods may be found in Chacon, Scott. *Pro Git*. Berkeley, Calif.: Apress, 2009. Print ("Pro Git"), which is incorporated by reference herein in its entirety.

Second, the VCM may provide an abstraction or API to version control functionality generically or at a higher level. Thus, for example, the VCM may provide one or more functions that are either generic version control operations or that are not specific to one single VCS system. By way of non-limiting example, the VCM may provide a high level API to version control operations such as check-in, check-out, commit, pull, push, merge, branch, clone, fork, tag, sign, diff, and/or any other command presented by a VCS. On receiving a request to the high level API, the VCM translates that request into one or more low level operations or commands specific to a particular VCS, and executes those operations so as to perform the desired functionality. Examples of Git-specific high level functions and commands may be found in Pro Git.

Third, the VCM may provide a processing, preparation, and/or conversion function to permit document data to be stored in a format compatible with a given VCS. Many version control systems are not adapted to directly store objects from an ORM or database tables. The VCM may be configured to translate a particular document object from its native format into a format suitable for storage in a VCS. Alternately, the VCM may be structured so that it is capable of translating arbitrary object or database content into a form storable in the VCS and which will enable the functionality of the VCS.

For example, the Git VCS is not natively adapted to store non-flat-file data, including data objects (e.g. objects represented in an object oriented programming language) or database tables in a way which permits full VCS functionality. A VCM conversion function may be employed to translate a document comprised of a collection of database objects into a series of flat files and/or directories. In one embodiment, the document to be translated is a document stored as a collection of linked objects including contacts objects, relationship objects, and/or nodes. These objects are serialized to files in the JSON, YAML, XML, XHTML, or other formats, and stored, using the other functions of the VCM, into the VCS. The files may be written to disk, and the native commands of the VCS may be used to incorporate them into the VCS. Alternately, the files could be stored directly into a storage subsystem of the VCS using either the low level or high level commands or API supplied by the VCM.

As another example, a VCM may incorporate processing, preparation, and/or conversion functionality necessary to use other existing document formats with a VCS. By way of non-limiting example, the VCM may be programmed to inspect a Microsoft Word .DOC file and store the .DOC file, along with document data extracted from the .DOC file, into a VCS so as to enable some or all of the version control functionality provided by the VCS.

As another example, in the instance where the VCS is Git, the VCM may translate all or some portions of a Microsoft Word .DOC file into a native object format of the document processor program or document management platform, and then commit it to the VCS and/or the ORM. Thus, using one or more of these techniques, a document may be imported from an existing file format into the inventive document processor program.

Alternately, the VCM may translate a .DOC file into the native object format of the VCS, rather than the document processor program, for storage and re-create it in its original format on demand. Thus for example, a .DOC file may be broken up into separate text, image, and/or formatting sections for storage in the VCS, and later re-created by the VCM. Thus using one or more of these techniques, the inventive document processing system may be used to add the high level and low level version control functionality described herein to existing documents in existing formats such as .DOC.

It will be apparent to one of ordinary skill in the art that any of the various file formats mentioned or described herein are merely exemplary and not limiting. The principles of the invention apply equally to other file formats such as .DOCX, .XLS, .XLSX, WordPerfect, OpenOffice, PowerPoint, KeyNote, Pages, Numbers, Outlook, Email, Open Document Format, PDF, .CSV, and any other word processing, spreadsheet, presentation, or other document format currently known or later developed; and such application is intended to be fully within the scope of this invention.

In some embodiments, the VCM creates an abstraction layer and/or API to a VCS, allowing non-standard or non-traditional types of data to be stored within a VCS, including a source code VCS. The VCM could also be adapted to a customized or in-house version control system, and thus adapted to store versioning data in the database, on the file system, in the cloud, or in any other place where data may be stored. In other words, a separate back-end VCS is not strictly necessary, as a VCM may be designed to actually implement each of the necessary high-level and/or low level version control functions that its API exposes. In such a case, the VCM may actually serve as a combined VCM and a VCS, and such a variant is still fully within the scope of this invention. It will also be apparent to one or ordinary skill in the art that, though the VCM is designed to store documents, it may also store any arbitrary database data stored in tables, up to and including entire databases. Furthermore, systems with data stored in non-SQL databases, such as so-called "no sql" or "document databases" are also well suited to the use of a VCM to store versioned data.

When a document processor program and/or document management platform is used in conjunction with a VCM, highly optimized workflows may be enabled and may be used by the users of the document system. These workflows are not enabled by prior document systems or version control systems because of the inability to properly store documents in a preferred format (e.g. flat text files, images, scalable vector graphics, etc.) for the VCS, thus limiting the ability of the VCS to exercise all of its functionality. For example, although a Microsoft Word .DOC file may be stored in a typical VCS like any other file, the VCS does not know how to identify specific differences between two versions of a .DOC file. Accordingly, the VCS will be unable to report to the document system, or to a user, which users have changed which portions of the document and will be unable to merge the changes created by multiple users.

One example of a workflow enabled by the present invention is a Shared Repository workflow, as depicted in FIG. 16. In this workflow, each worker 1603, 1604, 1605 contributes changes to and edits to a single shared repository 1601. Whenever a worker attempts to submit changes, either those changes can be automatically merged with the current version, or a conflict arises. If a conflict arises, the worker must manually merge the changes before being allowed to continue and finish the submission of that worker's changes. In this way, each worker 1603, 1604, 1605 directly contributes to the drafting and editing process for a document, but without creating multiple un-mergeable or un-merged document versions as is common under current methods and systems.

Figure 17:
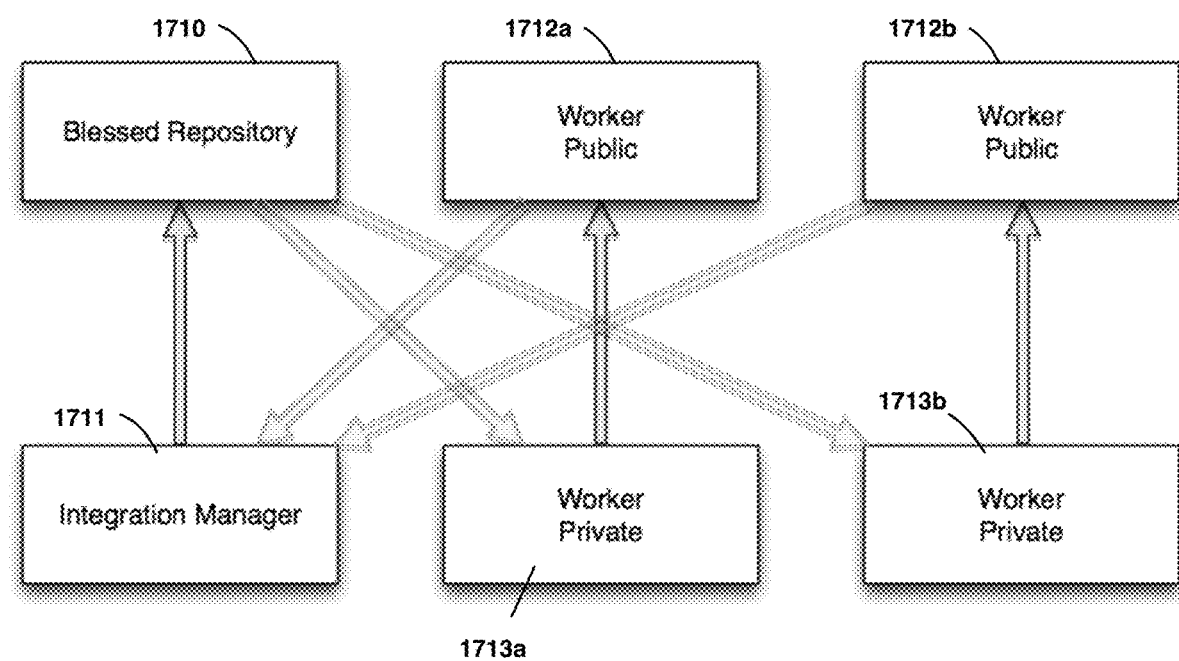
FIG. 17 shows a schematic diagram of an exemplary version control system.

Another example of a workflow enabled by present invention includes the "Integration Manager" workflow, as shown in FIG. 17. In the Integration Manager workflow, there is a single central repository, known as the "blessed repository" 1710. The blessed repository typically is the canonical source for the document. Workers working on the document pull the document and updates to it from the blessed repository into their private, or local, repositories 1713*a*, 1713*b*. Changes drafted by workers may be stored into their local repositories and/or may be stored into their public repositories 1712*a*, 1712*b*. When the worker has changes that they desire to share with the others (e.g., teammates), those changes are stored into the worker's public repository.

In this model, optionally only one or more workers acting as "integration managers" 1711 may submit changes to the blessed repository 1710. Non-integration managers (i.e., ordinary workers) may not submit changes directly to the blessed repository. Note that where reference is made here to "public" or "private" repositories, this designation does not necessarily refer to a security or permissions requirement imposed on the repositories themselves, although security may optionally be so imposed. Rather the designation "public" and "private" may simply refer to the intended use of the repositories. Thus for example, a worker may accumulate ongoing changes in his private repository that are not intended for review by others. When the worker would like to show his work to others, he may push those changes into the public repository. Alternately, the concept of private and public repositories may be done away with entirely, and workers may simply operate out of a single repository which is monitored or reviewed by other workers and/or integration managers.

After changes have accumulated in the private and/or public repository or repositories of one or more workers, an integration manager 1711 may retrieve changes from the workers' public repositories, and optionally those workers public repositories, and merge them into the integration manager's local or private repository. The integration manager may inspect the worker's repository to identify changes, or she may receive a communication requesting her to pull a set of one or more changes into the integration manager's repository. After successfully merging those changes into his repository, the integration manager 1711 stores the changes into the blessed repository 1710. In the context of document drafting, this workflow brings the benefit that multiple workers can edit the same document, even the same section of the same document, simultaneously. The integration manager, using the document processor program, the document management platform and the VCM can automatically or manually merge some or all of those changes into the blessed repository by selecting which contributions from which developers to include in the blessed repository.

Figure 18:
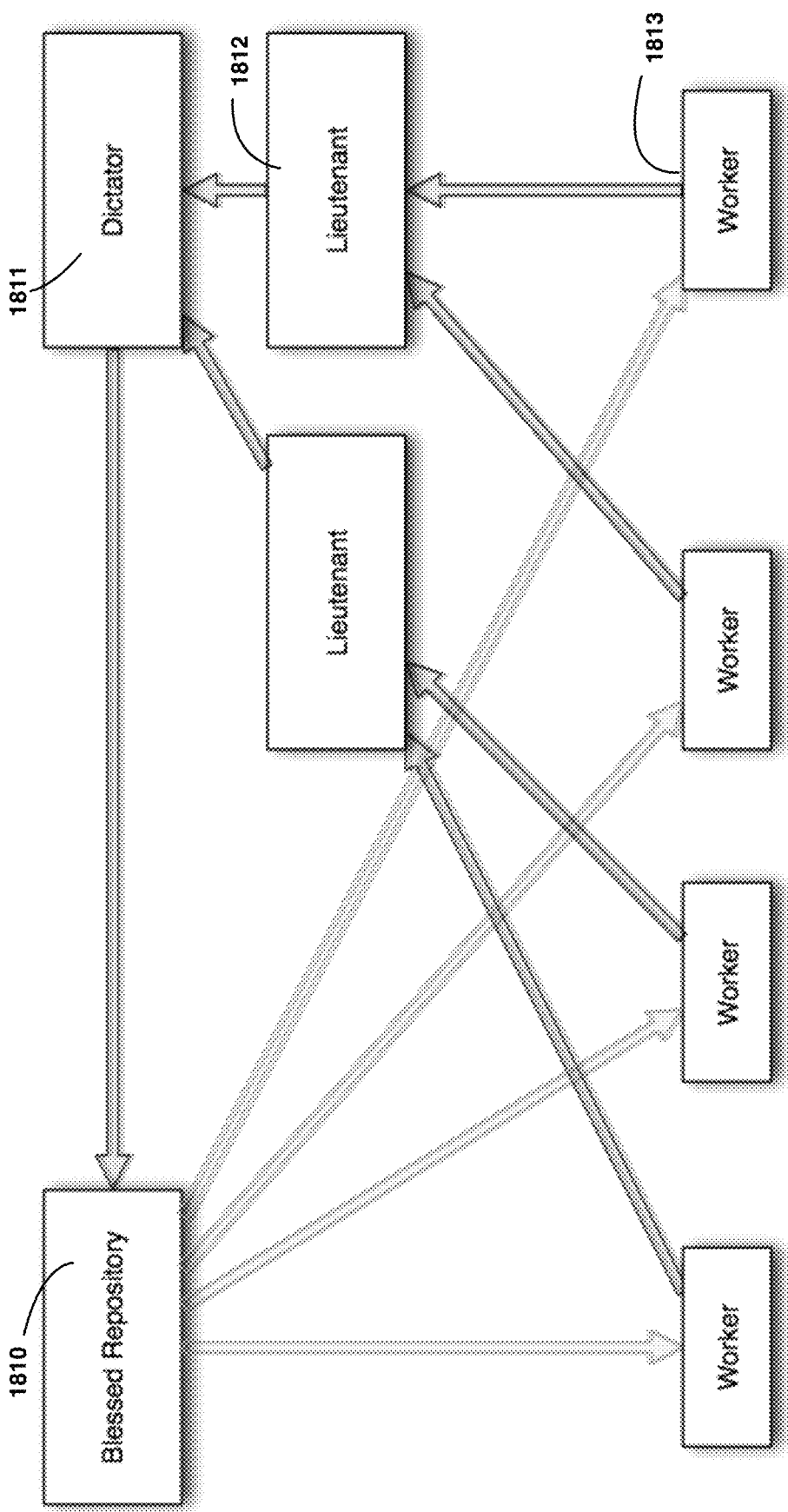
FIG. 18 shows a schematic diagram of an exemplary version control system.

Another example of a workflow enabled by the inventive VCM is the "dictator/lieutenants workflow," as shown in FIG. 18. This workflow is similar to the integration manager workflow described above. However, instead of one integration manager, there are multiple "lieutenant" integration managers 1812 that receive and merge contributions from the workers 1813. The contributions of the lieutenants may then be submitted to the dictator integration manger 1811, who accept or rejects them and submits those changes to the blessed repository 1810. In this way, using one or more layers of dictators and one or more layers of lieutenants, the work of large teams of document drafters can be coordinated in a hierarchical structure. By way of non-limiting example, some teams may assign a partner as the dictator, a number of junior partner/senior associates to the lieutenant roles, and any number of junior associates to the worker role.

Figure 21:
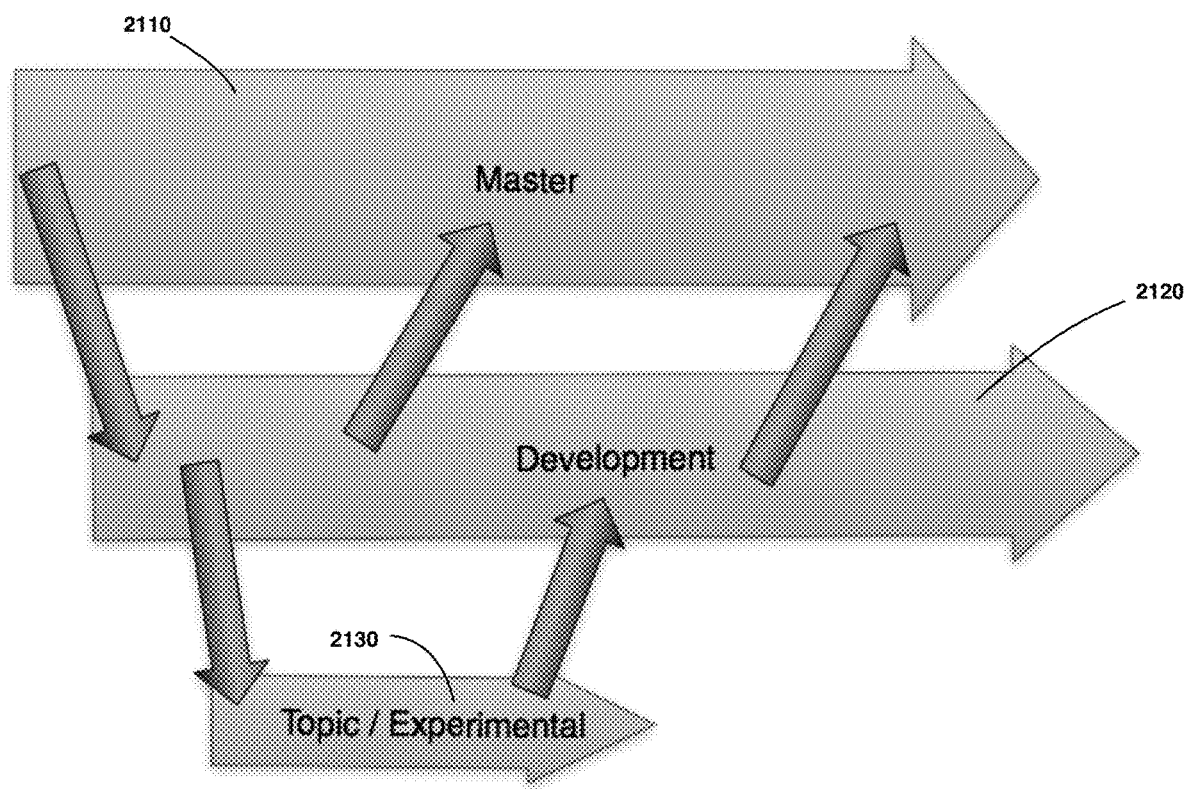
FIG. 21 shows a schematic diagram of an exemplary version control system.

Another document workflow pattern that may be enabled by the inventive document management platform and document processor program is the concept of branching and merging, as depicted in FIG. 21. The use of the VCM permits the development of a document to take place in separate branches. For example, there may be a known approved version of a document (the "master branch") 2110. This is the version which may be compiled by the document compiler to produce a rendered document suitable for printing, viewing, or filing with a court. However, one or more separate branches may be created (e.g., a "development" or "improvement" branch) 2120 where workers make edits and introduce new ideas into the document. Periodically, portions of the document may be merged into the main branch. Similarly, one or more experimental or "topic" branches may be created 2130. Such branches may be created to explore a very different approach or introduce an entirely new topic into the document. These changes may be later abandoned, or merged into the master or development versions of the documents.

Using this method and system for the drafting of documents, a frequently reused document (e.g., a set of corporate bylaws) may be updated over time, while remaining in use. New fixes to the existing document (e.g., adding an indemnification provision) may be tested in the development branch and later imported to the main branch. Radical changes (e.g., reworking the structure of the whole document) may be experimented within a topic branch, and the content of those changes later adapted to or included into the development or main branches.

It should be noted that the above described workflows are exemplary and do not limit the invention. They may be split apart into separate workflows, or combined with each other in whole or in part, to create hybrid workflows, and such workflows are intended to be fully within the scope of the invention. Such hybrid, combined, or separate workflows would include, without limitation, adding roles to an existing workflow, constructing a new workflow from the roles of existing workflows, modifying the number of dictators, integration managers, or workers in a workflow, adding additional levels of review above the roles in an existing workflow, and other modifications.

Figure 19:
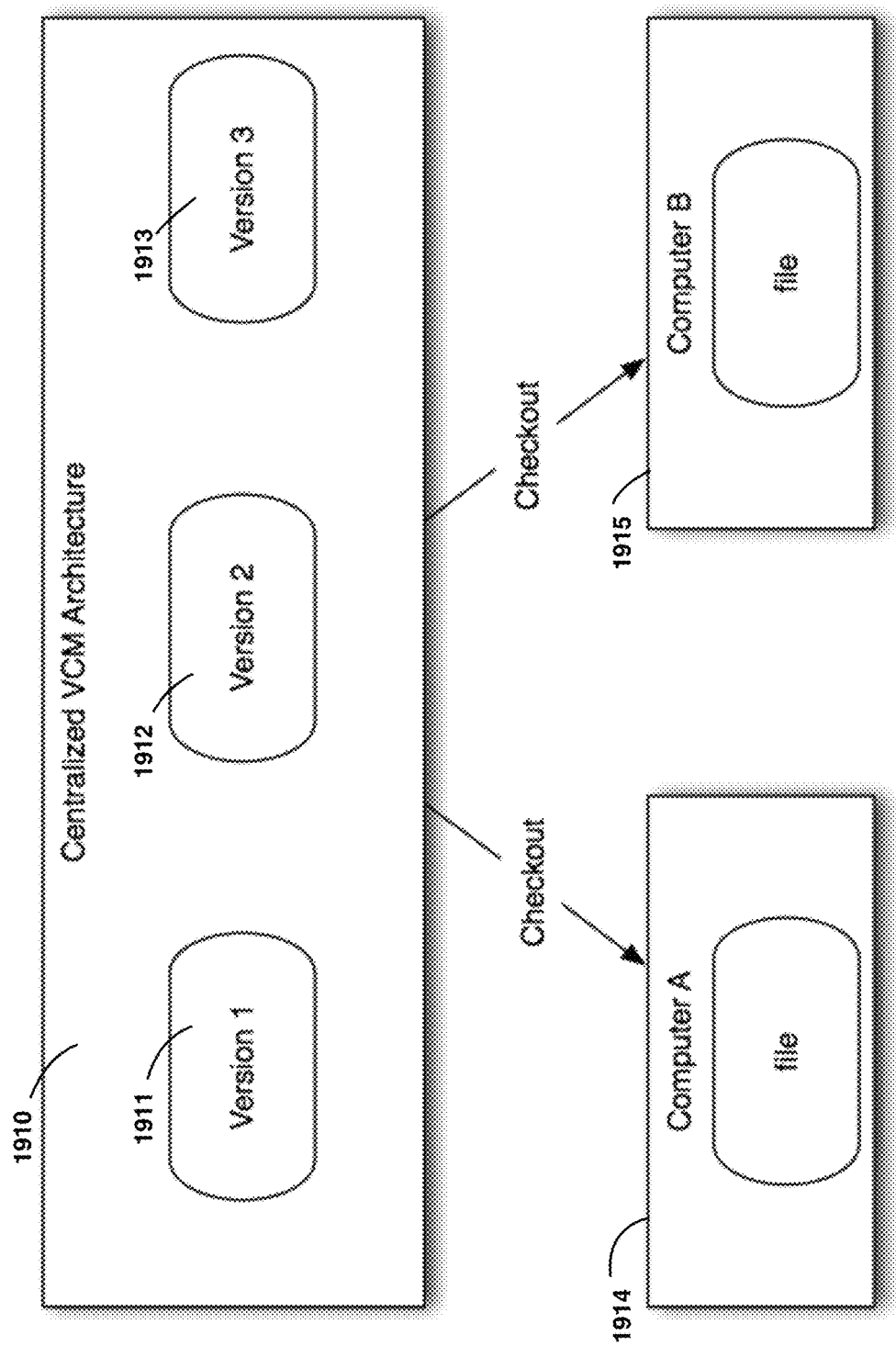
FIG. 19 shows a schematic diagram of an exemplary version control system.

Aside from workflows, the VCM may enable the use of novel architectures for a document system server and clients, such as the architecture depicted in FIG. 19. For example, a central server 1910 may contain each version 1911, 1912, 1913, and individual workers may check out versions to their local machines 1914, 1915.

Figure 20:
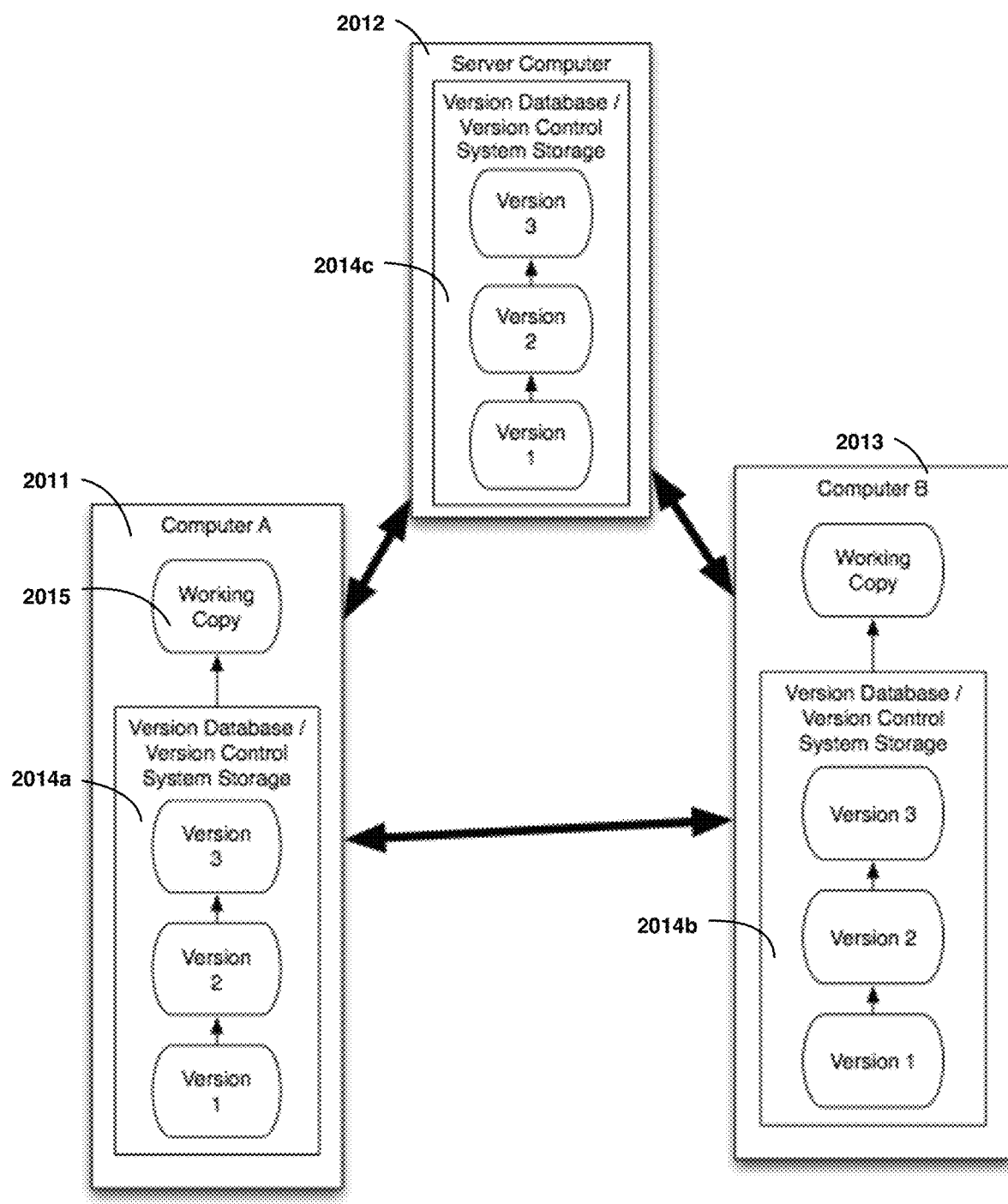
FIG. 20 shows a schematic diagram of an exemplary version control system.

Another architecture enabled by the document system is a distributed architecture, as depicted in FIG. 20. A distributed architecture may include all the capabilities of a centralized architecture (i.e., individuals may check out versions of documents from the central server 2012 and/or make copies of the repository on a local machine 2011, 2013). However, in a distributed architecture, each checked out copy of the repository contains a complete record of the entire repository 2014*a*, 2014*b*, 2014*c* and thus can act as a server for other workers. This enables an optimized offline mode of operation, because workers can still collaborate in the absence of the server.

By way of non-limiting example, a first worker 2011 may retrieve a copy of the document from the central server 2012, and then begin working and creating changes to the local copy 2015, possibly offline. A second worker 2013 may then desire to collaborate with the first worker. Rather than exchange changes through the central server 2012, the second worker 2013 instead collaborates and communicates changes directly with the first worker's copy of the repository 2014*a*, possibly over a network but without intermediation by a central repository. This may be useful in the situation where, for example, two members of a team are on an airplane or stuck in a hotel without access to the central server. If one computer has a copy of the repository, the other computer can connect to it and use it as a server. Alternately, the second computer 2013 can copy the first computer's copy of the repository 2014*a* and the two could begin working on separate, forked versions of the document, including by communicating pull requests to one another. These forked versions could then be merged later into the central server 2012, or with the other computer's repository. In this way, collaborative work on the document involving one or more workers can continue in any circumstance where at least one worker has a copy of the document and/or repository.

Unless specifically stated otherwise, as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a flash memory device, such as a compact flash card or USB flash drive.

Some exemplary embodiments described herein are described as software executed on at least one computer, though it is understood that embodiments can be configured in other ways and retain functionality. The embodiments can be implemented on known devices such as a server, a personal computer, a special purpose computer, a programmed microprocessor or microcontroller and peripheral integrated circuit element(s), and ASIC or other integrated circuit, a digital signal processor, a hard-wired electronic or logic circuit such as a discrete element circuit, or the like. In general, any device capable of implementing the processes described herein can be used to implement the systems and techniques according to this invention.

It is to be appreciated that the various components of the technology can be located at distant portions of a distributed network and/or the internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The terms determine, calculate and compute, and variations thereof, as used herein are used interchangeably and include any type of methodology, process, mathematical operation or technique.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

It will be apparent to one of ordinary skill in the art that the examples provided herein involving specific programming languages, typesetting languages, document formats, document types, specific software or programs, and other details are exemplary and that variations on any of these details are aspects of and are intended to be within the scope of the present invention. For example, although a document processor program is described herein as being separate from a document complier, it will be appreciated that a single program may include the functionality of both programs.

What is claimed is:

1. A computer-implemented method of creating a document comprising:
    creating, by a computer, a primary data object ("PDO"), wherein the PDO is associated with a document schema comprising information relating to:
        a plurality of allowable node data object types, and
        a plurality of allowable node data object relationships;
    providing, by the computer, a document drafting interface that permits creation of only node data objects comprising one of the plurality of allowable node data object types and one of the plurality of allowable node data object relationships;
    displaying, by the computer, via the document drafting interface, a first group of permitted node data object types selected from the plurality of allowable node data object types, such that a user of the document drafting interface may select a first node data object type from only the first group of permitted node data object types;
    upon receiving a selection of the first node data object type, creating, by the computer, a first node data object comprising the first node data object type;
    associating, by the computer, the first node data object with the PDO;
    determining, by the computer, a second group of permitted node data object types selected from the plurality of allowable node data object types,
        wherein said determining is based on the first node data object type and the plurality of allowable node data object relationships;
    displaying, by the computer, via the document drafting interface, the second group of permitted node data object types such that the user may select a second node data object type from only the second group of permitted node data object types;
    upon receiving a selection of the second node data object type, creating, by the computer, a second node data object comprising the second node data object type;
        wherein a first relationship exists between the first node data object and the second node data object, the first relationship corresponding to one of the plurality of allowable node data object relationships;
    populating, by the computer, a content field of the second node data object with content data,
        wherein said content data is stored within one or more databases, and
        wherein the one or more databases are in informatic communication with one or more third party systems;
    associating, by the computer, the second node data object with the PDO; and
    creating, by the computer, a storable document, based on the PDO, the first node data object, the second node data object and a document template.

2. A computer-implemented method according to claim 1 further comprising:
   associating, by the computer, a metadata data object with the PDO, and
   wherein said creating a storable document is further based on the metadata data object.

3. A computer-implemented method according to claim 2, further comprising receiving the metadata data object from the user.

4. A computer-implemented method according to claim 3, wherein the metadata data object comprises information relating to the user.

5. A computer-implemented method according to claim 1, wherein the PDO is created upon receiving a document creation request, the request comprising a document type corresponding to the document schema.

6. A computer-implemented method according to claim 5, wherein the request is received from the user via a document management interface or the document drafting interface.

7. A computer-implemented method according to claim 6, wherein:
   the request is received from the user via the document management interface,
   the request further comprises a metadata data object,
   the metadata data object comprises information relating to a position of the user within the document management interface, and
   said creating a storable document is further based on the metadata data object.

8. A computer-implemented method according to claim 1, wherein the document drafting interface prevents the user from creating a third node data object having a third node data object type that is not one of the plurality of allowable node data object types.

9. A computer-implemented method according to claim 1, wherein the document drafting interface prevents the user from creating a third node data object having a second relationship to the second node data object that is not one of the plurality of allowable node data object relationships.

10. A computer-implemented method according to claim 1, wherein the first relationship between the first node data object and the second node data object is a parent-child relationship.

11. A computer-implemented method according to claim 10, wherein:
    the first node data object type is a heading, and
    the second node data object type is a sub-heading, paragraph or list.

12. A computer-implemented method according to claim 10, wherein:
    the first node data object type is a list, and
    the second node data object type is a list item.

13. A computer-implemented method according to claim 1, wherein the first relationship between the first node data object and the second node data object is a sibling-sibling relationship.

14. A computer-implemented method according to claim 13, wherein the first node data object type and the second node data object type are different.

15. A computer-implemented method according to claim 13, wherein the first node data object type and the second node data object type are the same.

16. A computer-implemented method according to claim 1, further comprising:
    associating, by the computer, a madlib data object with the second node data object, and
    wherein said creating a storable document is further based on the madlib data object.

17. A computer-implemented method according to claim 16, wherein the madlib data object is also associated with a third node data object that is not associated with the PDO.

18. A computer-implemented method according to claim 1, wherein the document template comprises one or more of: background content, program logic and output logic.

19. A computer-implemented method according to claim 1, wherein the storable document is an intermediate document.

20. A computer-implemented method according to claim 19, further comprising creating a storable rendered document based on the intermediate document.

* * * * *